US012390738B2

(12) United States Patent
Menapace et al.

(10) Patent No.: US 12,390,738 B2
(45) Date of Patent: Aug. 19, 2025

(54) PLOTTING BEHIND THE SCENES WITH LEARNABLE GAME ENGINES

(71) Applicant: Snap Inc., Santa Monica, CA (US)

(72) Inventors: Willi Menapace, Santa Monica, CA (US); Aliaksandr Siarohin, Los Angeles, CA (US); Sergey Tulyakov, Santa Monica, CA (US)

(73) Assignee: Snap Inc., Santa Monica, CA (US)

( * ) Notice: Subject to any disclaimer, the term of this patent is extended or adjusted under 35 U.S.C. 154(b) by 186 days.

(21) Appl. No.: 18/121,268

(22) Filed: Mar. 14, 2023

(65) Prior Publication Data

US 2024/0307783 A1 Sep. 19, 2024

(51) Int. Cl.
*A63F 13/67* (2014.01)
*A63F 13/57* (2014.01)

(52) U.S. Cl.
CPC .............. *A63F 13/67* (2014.09); *A63F 13/57* (2014.09); *A63F 2300/66* (2013.01)

(58) Field of Classification Search
CPC ....... A63F 13/67; A63F 13/57; A63F 2300/66
USPC ......................................................... 463/63
See application file for complete search history.

(56) References Cited

U.S. PATENT DOCUMENTS

| | | | | |
|---|---|---|---|---|
| 10,850,199 B2 * | 12/2020 | Nicolades | ............... | A63F 13/35 |
| 10,852,838 B2 * | 12/2020 | Bradski | ................... | G06F 3/014 |
| 11,978,141 B2 * | 5/2024 | Saharia | ..................... | G06T 5/70 |
| 2015/0141151 A1 * | 5/2015 | Wible | ..................... | A63F 13/30 |
| | | | | 463/42 |

* cited by examiner

*Primary Examiner* — Allen Chan
(74) *Attorney, Agent, or Firm* — CM Law; Stephen J. Weed

(57) ABSTRACT

A framework trains game-engine-like neural models from annotated videos to generate a Learnable Game Engine (LGE) that maintains states of the scene, objects and agents in it, and enables rendering the environment from a controllable viewpoint. The LGE models the logic of the game and the rules of physics, making it possible for the user to play the game by specifying both high- and low-level action sequences. The LGE also unlocks a director's mode where the game is played by plotting behind the scenes, specifying high-level actions and goals for the agents using text-based instructions. To implement the director's mode, a trained diffusion-based animation model navigates the scene using high-level constraints, to enable play against an adversary, and to devise the strategy to win a point. To render the resulting state of the environment and its agents, a compositional neural radiance field (NeRF) representation is used in a synthesis model.

20 Claims, 16 Drawing Sheets

PLOTTING BEHIND THE SCENES WITH LEARNABLE GAME ENGINES

TECHNICAL FIELD

Examples set forth herein generally relate to game engines and, in particular, to game engines that accurately model game logic, comprehend the meaning of different parts of game environments, allow for high-level goal-driven control of game flow, and model physical interactions of objects in three-dimensional (3D) space.

BACKGROUND

In the last few years, video game simulation using deep neural networks has emerged as a new research trend. The objective is to train a neural network to synthesize videos based on sequences of actions provided at every time step. This problem was first addressed using training videos annotated with the corresponding action labels at each time step. Some approaches consider a discrete action representation, which is difficult to define a priori for real-world environments. More recently, a framework has been proposed that uses a continuous action representation to model real-world driving scenarios. Devising a good continuous action representation for an environment, however, is complex. One approach learns without supervision a continuous action space as the latent space of a variational autoencoder. The obtained continuous action space, however, is high-dimensional and difficult for the user to interact with. To produce an action representation that is more easily controllable, it has been proposed to learn a discrete action representation. This idea has been expanded by modeling actions as a learned set of geometric transformations. Other approaches propose representing actions by separating them into a global shift component and a local discrete action component.

Rather than employing a 2D neural network model, an approach called playable environments uses a neural radiance field (NeRF)-based renderer that enables the playable environments to represent complex 3D scenes. However, the employed discrete action representation shows limitations in complex scenarios such as tennis, where it is only able to capture the main movement directions of the players and does not model actions such as ball hitting. No text action representation that specifies actions at a fine level of granularity (i.e., which particular ball-hitting action is being performed and where the ball is sent) has been described that remains interpretable and intuitive for the user.

Existing approaches perform generation in an auto-regressive manner, conditioned on the actions. Therefore, these approaches are unable to perform constraint- or goal-driven generation for which non-sequential conditioning and fine-grained action modeling may be necessary.

BRIEF DESCRIPTION OF THE DRAWINGS

In the drawings, which are not necessarily drawn to scale, like numerals may describe similar components in different views. Some nonlimiting examples are illustrated in the figures of the accompanying drawings in which.

DETAILED DESCRIPTION

Figure 1:
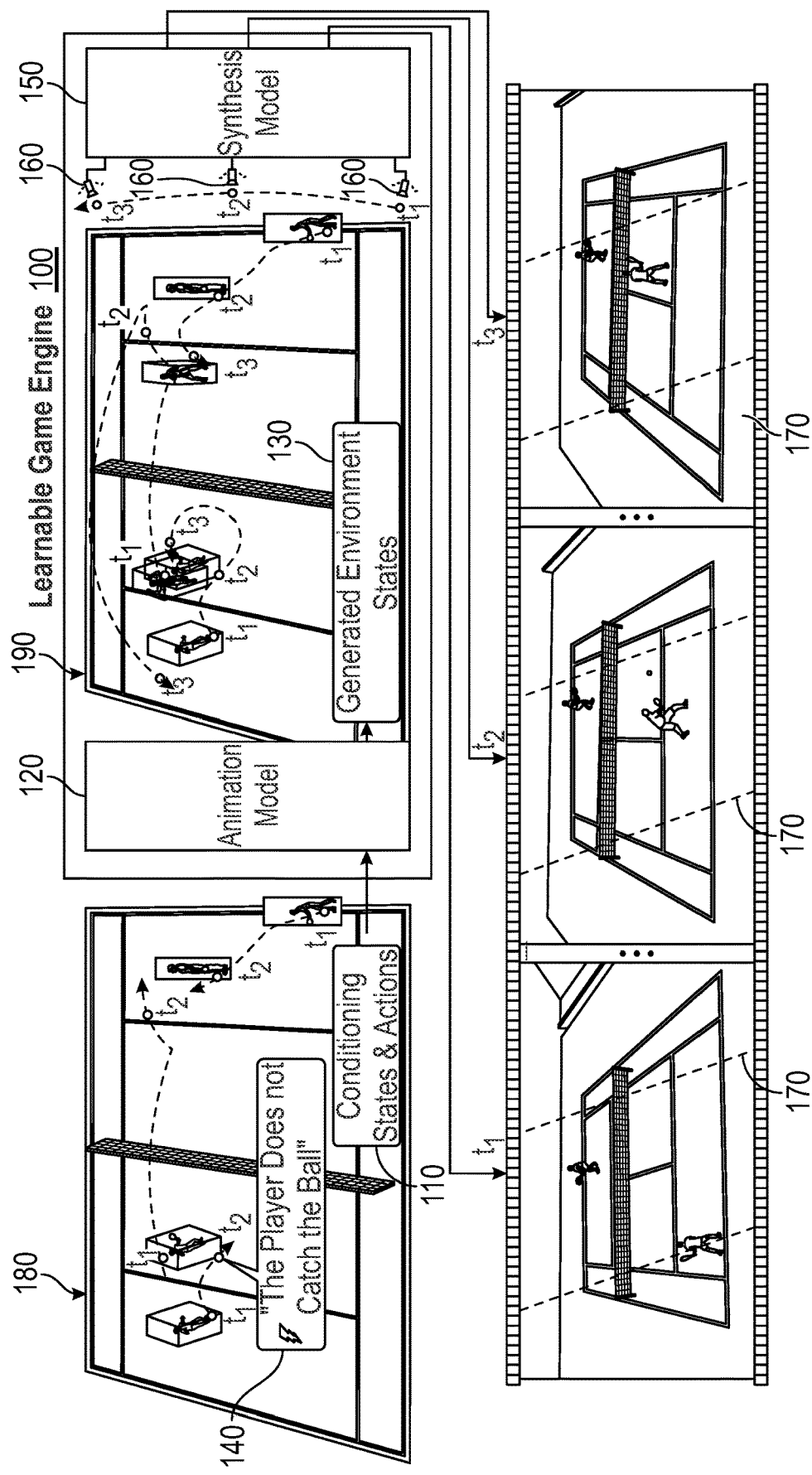
FIG. 1 is an illustration depicting a learnable game engine (LGE) that learns a game-engine-like model from annotated videos.

Game engines are powerful tools in computer graphics. A framework is described herein for training game-engine-like neural network models, from monocular annotated videos. The result—a Learnable Game Engine (LGE)—that maintains states of the scene, objects and agents in it, and enables rendering the environment from a controllable viewpoint. Similar to a game engine, the LGE models the logic of the game and the rules of physics, making it possible for the user to play the game by specifying both high- and low-level action sequences.

In addition, the LGE unlocks a director's mode, where the game is played by plotting behind the scenes, specifying high-level actions and goals for the agents. To implement the director's mode, "game AI" is learned that is encapsulated by an animation neural network (hereinafter "animation model") to navigate the scene using high-level constraints, to enable play against an adversary, and to devise the strategy to win a point. An aspect of learning such game artificial intelligence (AI) is a large and diverse text corpus describing detailed actions in a game that is used to train the animation model. To render the resulting state of the environment and its agents, a compositional NeRF representation is used in a synthesis neural network (hereinafter "synthesis model"). The results are presented as collected using annotated and calibrated large-scale Tennis and MINECRAFT® datasets. The LGE described herein unlocks applications beyond capabilities of the current state of the art.

Recent advancements in graphics have brought new capabilities to game engines. Their primary purpose has been to democratize game development but, due to the supported features and quality, their impact quickly reached a variety of creative applications spanning augmented reality (AR), virtual reality (VR), data generation, and, most recently, virtual film production (where unreal and unity engines are used to photorealistically render environments for film production). To be used in these applications, a game engine supports diverse environments with static and dynamic objects of different styles such as articulated agents controlled either by users or by the game AI. Game engines further model physics and game logic that govern how agents interact with their environment. The environment can be rendered from any viewpoint allowing the developer to create the desired perspective of the scene.

Building a game engine is an enormously challenging task. There are, however, thousands of videos with games already played and real-world matches spectated. The configurations described herein address the question of whether it is possible to learn a game engine using this data. Broadly speaking, given a large collection of data, numerous two-dimensional (2D) observations of agents interacting with their environments can be obtained. Previously, it was shown that such data can be used to learn to generate videos interactively and to build 3D environments where agents can be controlled through a set of discrete actions. However, when applied to complex or real-world environments, some approaches have several limitations such as not accurately modeling game logic, not comprehending the meaning of different parts of environments, not allowing for high-level goal-driven control of the game flow, and not modeling physical interactions of objects in 3D space.

Accordingly, a framework is presented herein for building game-engine like neural network models by observing a handful of annotated videos. Due to the versatility of supported applications, the framework is referred to herein as Learnable Game Engines (LGEs). The described framework significantly extends the range of conditioning signals that the model can utilize. Parts of these signals, such as the locations of the objects and their poses that describe the state of the environment, can be easily obtained by using off-the-shelf detector models. This information can be efficiently used to learn a discrete action space. In this way, the user can control agents by providing a sequence of atomic actions such as "move left," "move right," and so on. However, such an overly simplistic action space strongly limits the ability of the user to control players and prohibits learning AI controlled agents, or non-playable characters, that understand the environment and can act in a more semantic way. Accordingly, the LGEs described herein are designed to perform high-level game-specific scenarios or scripts, specified by means of natural language and desired states of the environment.

The LGEs described herein relate to neural game simulation as described in the background above. The LGEs also relate to sequential generation, text-based generation, and neural rendering.

Sequential data generation mainly has been addressed with auto-regressive formulations combined with adversarial or variational generative models. Recently, diffusion models have emerged as a promising solution to this problem leading to impressive results in multiple applications such as audio and video synthesis, language modeling, and human motion synthesis. Diffusion models, also known as diffusion probabilistic models, are a class of latent variable models that are Markov chains trained using variational inference to learn the latent structure of a dataset by modeling the way in which data points diffuse through the latent space. In implementations, a neural network is trained to denoise images blurred with Gaussian noise by learning to reverse the diffusion process. Examples of generic diffusion modeling frameworks include denoising diffusion probabilistic models (DDPM), noise conditioned score networks, and stochastic differential equations. Following this methodological direction, a score-based diffusion model has been introduced for imputing missing values in time series. A training procedure based on masks simulates missing data.

In recent years, several articles have addressed the problem of text-based generation. Several works address the problem of generating images and videos with arbitrary content and arbitrary 3D shapes. For example, a video generation framework has been introduced that can incorporate various conditioning modalities in addition to text, such as segmentation masks or partially occluded images. Such an approach may employ a frozen RoBERTa language model and a sequence masking technique.

There are models to generate human motion sequences from text. MotionCLIP aligns the space of human motions to the one of a pretrained Contrastive Language-Image Pre-training (CLIP) model. Temporal action compositions for 3D humans (TEACH) adopts an auto-regressive model conditioned on a frozen CLIP encoder and generates a sequence of parameters of a skinned multi-person linear (SMPL) body model. Diffusion models have shown strong performance on this task whereby sequences of human poses are generated by a diffusion model conditioned on the output of a frozen CLIP text encoder. However, these approaches model only a single human and do not model human interactions with the environment.

Neural rendering was recently revolutionized by the advent of NeRF. Several modifications of the NeRF framework have been proposed to model 3600 scenes, deformable objects, and decomposed scene representations. In addition, several works have improved the efficiency of the original multilayer perceptron (MLP) representation of the radiance field by employing octrees, voxel grids, triplanes, hash tables, or factorized representations. Other approaches model player deformations using an articulated 3D prior and linear blend skinning (LBS). However, such approaches do not consider scenes with multiple players.

FIG. 1 illustrates a learnable game engine 100 that learns a game-engine-like neural network model from annotated videos. LGEs 100 enable the generation of videos using a wide spectrum of conditioning signals 110 such as player poses, object locations, and fine-grained textual actions indicating what each player should do. An animation model 120 uses this information 110 to generate future, past, or interpolated intermediate environment states 130 (e.g., at times $t_1, t_2, \ldots, t_n$) according to the learned game logic and laws of physics. At this stage, the animation model 120 is able to perform complex action reasoning such as generating a winning shot if the user-provided condition in the form of an action "the [other] player does not catch the ball" is specified, as shown at 140 in FIG. 1. For example, to accomplish this goal, the animation model 120 decides that the bottom player should hit the ball with a "lob" shot, sending the ball high above the opponent, who is unable to catch it. As a game engine, LGE 100 renders the scene from a user-defined viewpoint using a synthesis model 150 where the style of the scene and the camera viewpoint from one or more cameras 160 can be controlled explicitly by a user over the time sequence $t_1, t_2, t_3, \ldots$ to generate a sequence of images 170 at inference time for a selected style that is also selectable by the user.

In its simplest form, for games like MINECRAFT®, the high-level game-specific scenarios or scripts allow the user to instruct the player to perform sequences of actions such as "Jump onto a birch pole and run through the stairs." For tennis, the high-level game-specific scenarios or scripts enable a user to provide a high-level goal to a player to hit or miss a score, or requesting a player to send the ball into a specific part of the field. Besides this, many more complex applications are made possible. As an example, given desired starting and ending states, the LGEs 100 can generate in-between scenarios that lead to the observed outcome. Besides these generation tasks, the LGEs 100 can semantically manipulate the actions of a player in existing videos. For example, as shown in FIG. 1, given the initial states 180 of a real tennis video in which a player lost a point, the LGE 100 prompted by the command "the [other] player does not catch the ball" 140 can perform the necessary action to win the point at states 190.

In sample configurations, real-world data of matches contain dynamics and semantics of the game. The LGE 100 can efficiently learn these dynamics and semantics. While the task is challenging for a machine learning system, an experienced spectator can explain the strategy selected by a particular player with ease and sometimes even propose an advantageous course of action. The LGE 100 takes advantage of this by training on user commentaries that describe detailed actions of a game, thereby greatly facilitating learning game AI. The resulting game AI brings interesting creative capabilities at inference time. Not only does it allow the user to play a game by providing commands, moving the camera, and changing the style, but it also unlocks the "director's mode" where the observer can "plot behind the scenes" by providing high level, goal-driven instructions to the player. The LGE 100 then leverages its knowledge of the learned physics and semantics of the game to perform action reasoning in time and generate videos that satisfy the director's instructions. This makes the described framework capable of generating complex actions in time. In addition, training with language enables the animation model 120 to understand semantic parts of the environment in which the game is played. For example, the animation model 120 learns the locations of certain parts of the environment, as well as the sequence of actions necessary to end up in these locations. For example, in a tennis application, the LGE 100 understands the locations of the left and right service boxes, no-man's land, and so on. The training set of videos with annotations may be used to train the LGE 100 to manipulate the camera, style, and user actions specified at inference time. Similarly, in MINECRAFT®, the locations of gold, birch, and decorated poles are known to the animation model 120. These inferences are made from language and language alone.

Broadly speaking, a game maintains states of its environments, and of objects and agents populating it. The objects can be changed by editing their state, for example by swapping styles or changing their locations. Given that the states are provided, a game engine can proceed and render the environment with its actors using a controllable camera from a desired viewpoint. To play games, one changes the state of its agents, either by providing a sequence of commands or by means of intelligent non-playable characters.

The LGEs 100 described herein follow the high-level structure highlighted in FIG. 1. The synthesis model 150 maintains a state for every object and agent included in the game and is responsible for rendering the game to the image space. Depending on the objects, the state of the objects in the game can include the object's location, pose, velocity, and style. Once states are defined, they may be rendered using the compositional NeRF approach followed by an enhancer for superior rendering quality. This flexible formulation allows game-specific objects to be modeled separately. For example, tennis-related objects, such as the ball, the racket, or scoreboards are handled with dedicated procedures to improve realism. To support objects of a diverse nature present in games, two types of parametrizations may be employed to represent their appearance. For players and other 3D objects, a canonical voxel grid representation may be used, while for 2D planar objects, such as scene elements, 2D feature maps may be used. Poses of articulated objects may be modeled by a deformation network.

Modeling sophisticated goal-driven game logic and learning "game AI" as described herein is challenging as there exists no data with the desired or "right" actions in a game, as many strategies can lead to a successful outcome. Such a sophisticated game AI can be efficiently learned by using text labels describing actions happening in a game. A non-autoregressive diffusion model may then be trained using masking to provide the animation model 120. The animation model 120 successfully learns game AI and, at inference time, is capable of performing tasks of the type described non-exhaustively herein.

The task of plotting behind the scenes to play games and manipulate videos in the director mode is performed by first collecting two large-scale monocular video datasets. The first dataset is the MINECRAFT® dataset containing 1.2 hours of videos depicting a player moving in a complex environment. Camera calibration, 3D player poses, and a text caption are provided for each frame describing whether the player is walking, running, jumping over platforms and walls, falling or climbing ladders, and using referential language to indicate the different parts of the environment. In addition, such annotations are automatically extracted from MINECRAFT®. The second dataset is a real-world dataset with 15.5 hours of high-resolution professional tennis matches. The dataset contains 1.12M frames for which accurate camera calibration, skinned multi-person linear (SMPL) body parameters for each player, 3D ball localization, and 84.1k diverse and rich text descriptions of the actions performed by each player in each frame are obtained. Such captions are manually annotated using technical language that describes where and how each player moves, how the ball is hit, and where it is sent. In terms of rendering quality, the described framework produces videos at the original framerate while doubling the output resolution with respect to other approaches. In terms of game AI, the framework unlocks goal driven game playing and implements learning game engines and AI for diverse real-world videos.

As will be described below, the Learnable Game Engines (LGEs) framework described herein models player deformations using an articulated 3D prior and linear blend skinning (LBS). However, the LGE framework described herein further considers scenes with multiple players and applies a new method to articulated objects with varied structures for their kinematic trees. The new method adopts a composable scene formulation that uses voxel or plane representations instead of computationally-inefficient multi-layer perceptron (MLP) representations.

Figure 2A:
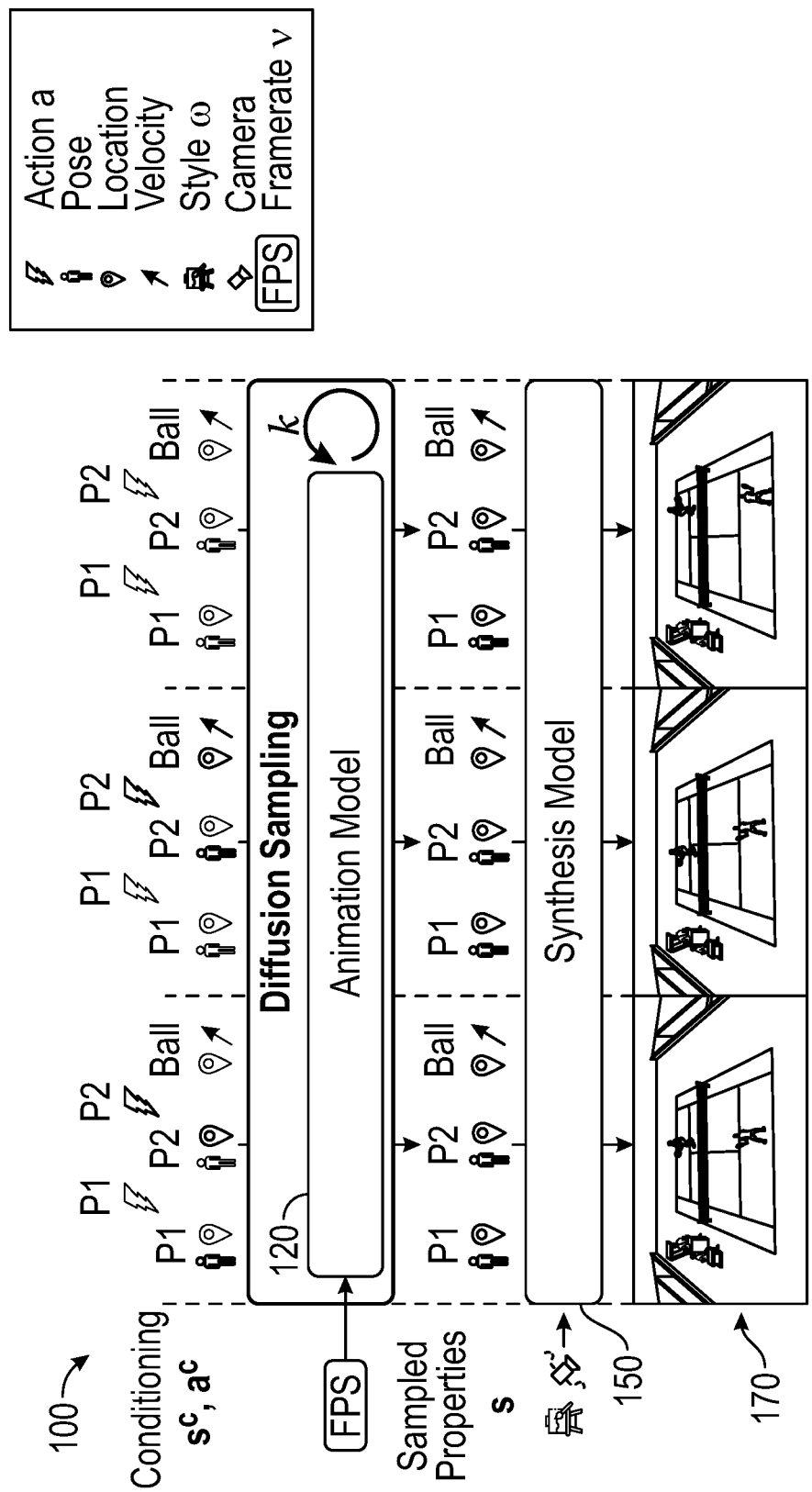
FIG. 2A is an illustration depicting an overview of the LGE in a sample configuration.
Figure 2B:
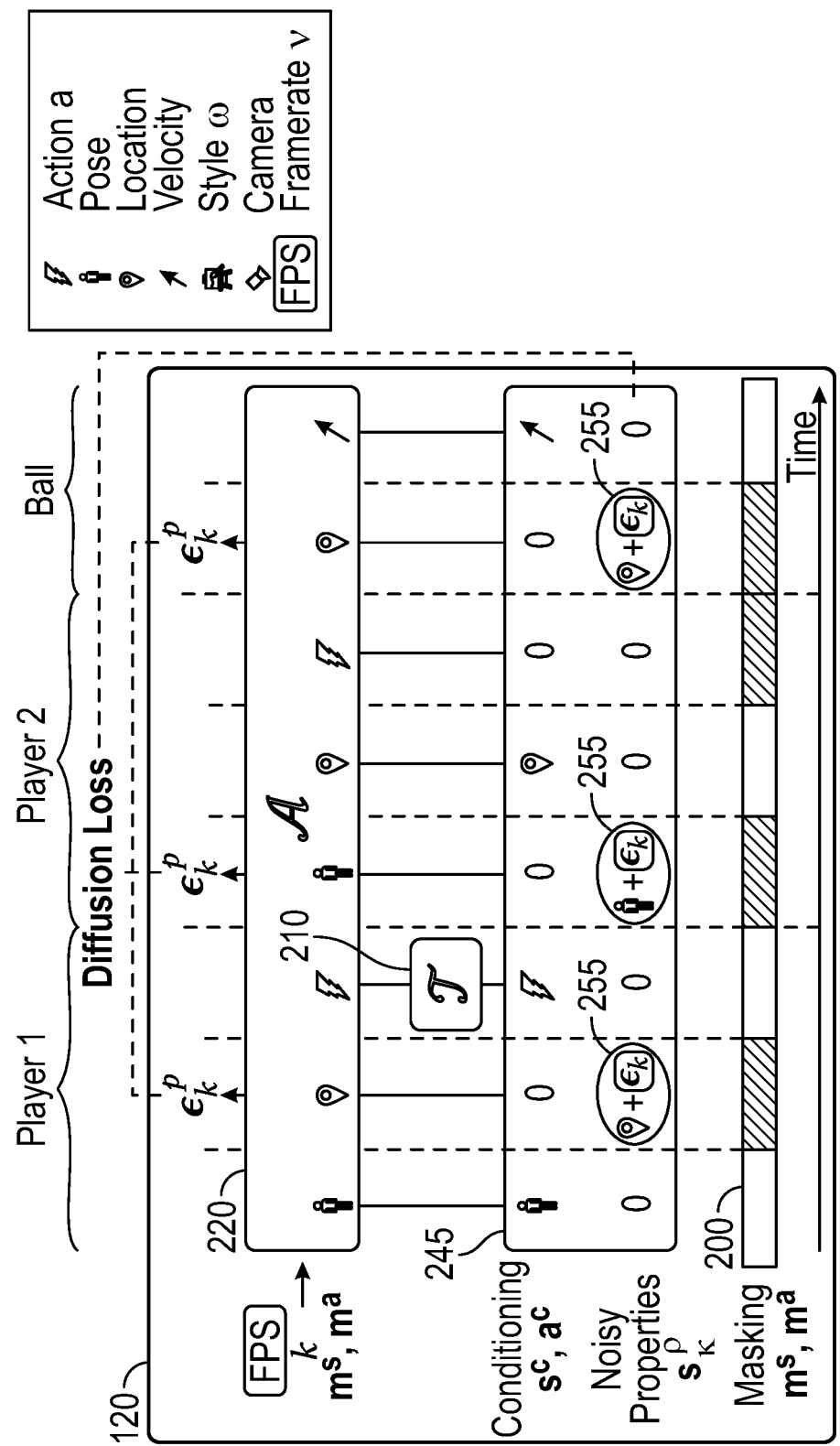
FIG. 2B is an illustration depicting a diffusion-based animation model in a training configuration.
Figure 2C:
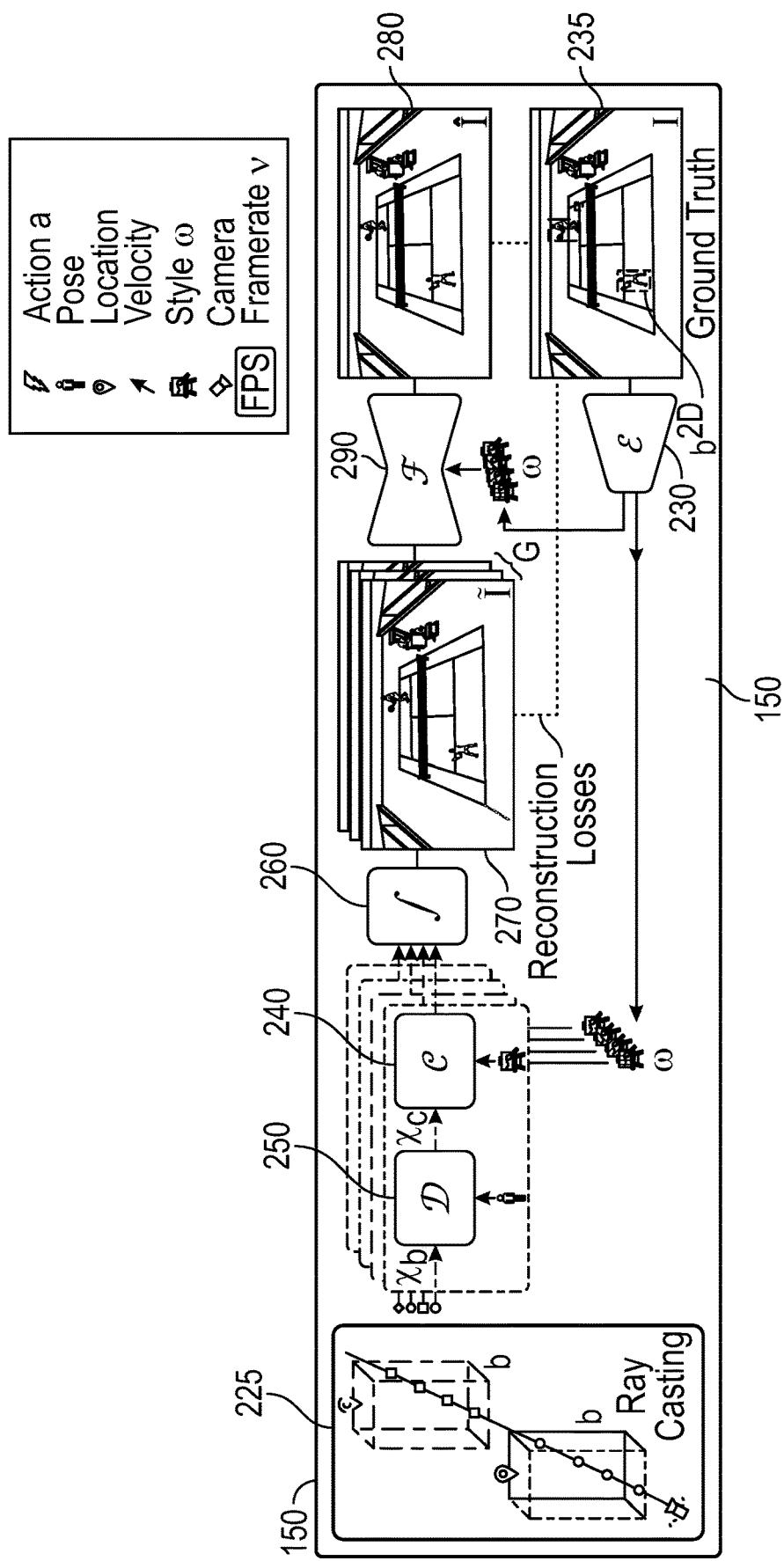
FIG. 2C is an illustration depicting a synthesis model that renders a current state using a composition of neural radiance fields, one for each object, in a sample configuration.

The LGEs 100 are described with respect to FIGS. 2A-2C. LGEs 100 allow the user to perform a range of dynamic scene editing tasks. Some of them are low-level, such as changing the camera, the style of the scene, or the position and pose of individual objects, which may be provided as inputs to the LGEs 100. Others are high-level, such as controlling players using actions, playing against an opponent, changing the plot of the sequence, and much more. Support for all these high-level tasks is introduced by means of text-based controls, which are an expressive, yet an intuitive form of editing for such a wide range of tasks. FIGS. 2A-2C show an example for a Tennis dataset, but could be expanded to represent a plurality of players and objects as well as other datasets including, for example, the MINECRAFT® dataset described herein.

Similarly to traditional game engines that maintain states of each object and agent, render the environment using a graphics pipeline, and have a model of game logic, the LGE 100 is divided into two modules: a synthesis model 150 and an animation model 120. The task of the synthesis model 150 is to generate an image given the high-level representation of the environment state including the pose, location, and velocity of the objects as well as the style and camera view, for example. The animation model 120, on the other hand, models the game's logic, with player actions and interactions, in the high-level space of the environment states. The overview of the LGE 100 is provided in FIG. 2A.

FIG. 2A illustrates an overview of a LGE 100. The animation model 120 produces states s based on user-provided conditioning signals for states $s^c$ and action $a^c$ that are rendered by the synthesis model 150. As shown in FIG. 2B, the diffusion-based animation model 120 predicts noise $\epsilon_k$ applied to the noisy states $s^p_k$ conditioned on known partial states $s^c$ (including pose but not position) and actions $a^c$ with the respective masks $m^s$, $m^a$ 200, diffusion step k of the diffusion model (which runs k times for good prediction) and framerate v in frames per second (FPS). The text encoder T 210 produces embedding for the textual actions, while the temporal model A 220 performs noise prediction. In the Tennis example, the animation model 120 outputs sampled properties of the objects, including pose and location of the players P1 and P2 and location and velocity of the ball. As shown in FIG. 2C, ray casting software 225 of the synthesis model 150 renders the current state using a composition of neural radiance fields, one for each object. A style encoder E 230 extracts the appearance w of each object at respective camera angles. Each object is represented in its canonical pose by C 240 for NeRF conditioning on style data and deformations of articulated objects based on pose are modeled by the deformation model D 250. It is noted that the deformation model D 250 is applied to deformable objects such as people but not to rigid objects such as a ball. After NeRF integration and composition of the sampled points at 260, the feature grid G 270 showing the rendered features is rendered to the final image 280 using the feature enhancer F 290.

In more detail, the LGE 100 defines the state of the entire environment as the combination of all individual object states. Consequently, each individual state is the set of the object properties such as the position of each object in the scene, their appearance, or their pose. Formally, the environment state at time t can be represented by $s_t \in S = (R^{n_1} \times \ldots \times R^{n_P})$, a combination of each object P (e.g., players P1 and P2 and Ball in the Tennis example) P properties (e.g., pose, style, position) of variable length $n_i$. These state representations capture all variable aspects of each individual object in the environment, thus they can be used by the synthesis model 150 to generate the scene.

On the other hand, the animation model 120 predicts the evolution of an environment in time, which is represented by the sequence of its states $\{s_1, s_2, \ldots s_T\} = s \in S^T$, where T is the length of the sequence. The LGE 100 provides control over sequence generation with the help of user-defined conditioning signals that can take two forms: explicit state manipulation and high-level text-based editing. With respect to the former, the user can specify some new state with altered values $s^c \epsilon S^T$ of some object properties. For example, the user could change the position of the tennis ball at time step t, and the automation model 120 will automatically adapt the position of the ball in other nearby states. As far as the latter is concerned, users can provide high-level text based values of actions $a^c \in L^{A \times T}$ that specify how objects are evolving in the sequence, where L is the set of all strings of text and A represents the number of objects in the scene that can be conditioned on textual actions. An example of such an object could be a tennis player, while an example of an action could be "The player takes several steps to the right and hits the ball with a backhand." In this case, the animation model 120 will generate the sequence of states that correspond to the aforementioned action (see FIG. 5). In contrast to previous approaches where only discrete action representations are used, LGEs 100 consider generic actions in the form of text that enable high-level, yet fine-grained control over the evolution of the environment.

An implementation of the synthesis model 150 and the animation model 120 will now be described. The synthesis model 150 is based on a compositional NeRF that enables explicit control of the viewpoint, of the scene layout, and of the properties of each object in the scene such as style, pose or position in the scene. On the other hand, the animation model 120 leverages recent advances in diffusion models and language models to capture the complex dynamics of the environment and their relation to the conditioning signals and generate realistic sequences of states. To train the framework, a dataset of camera-calibrated videos is assumed, where each video is annotated with the corresponding states s and actions a. The appearance of each object is assumed to be a latent variable that is jointly trained with the framework, so it is not included in the dataset.

Synthesis Model 150

The synthesis model 150 that renders states from arbitrary viewpoints is illustrated in FIG. 2C. The synthesis model 150 is built based on a compositional NeRF framework that enables explicit control over the camera and represents a scene as a composition of different, independent objects. Thanks to the independent representation of objects, each object can be modeled using a set of properties that is best suited to it, enabling the creation of a state representation where each object property is linked to an aspect of the respective object and can thus be easily controlled and manipulated. The compositional NeRF framework allows different, specialized NeRF architectures to be used for object deformations and canonical representations based on the type of each object. To further improve quality, rather than directly rendering red, green, blue (RGB) images with the NeRF models, features may be rendered and a feature enhancer convolutional neural network (CNN) may be used to produce the RGB output. In order to represent objects with different appearances, the NeRF and enhancer models may be conditioned on the style codes extracted with a dedicated style encoder. The synthesis model 150 may be trained using reconstruction as the main guiding signal.

The following description will review the fundamentals of NeRF models and detail how multiple NeRFs may be combined to compose scenes with multiple objects. The following description also will describe a style encoder, show the employed canonical volume modeling techniques used to allow efficient rendering, describe deformation modeling for the representation of articulated objects, illustrate a feature enhancer model, describe modeling of specialized objects, and describe the training procedure.

Scene Composition with NeRFs

Neural radiance fields (NeRFs) represent a scene as a radiance field, a 5D function parametrized as a neural network mapping the current position x and viewing direction d to density a and radiance c. Given such function and a desired camera pose, it is possible to render an image of the scene using NeRF for each object. This can be achieved by casting a ray r through each pixel and sampling 3D points along each ray using, for example, ray casting software 225 (FIG. 2C). The color c(r) associated with each pixel can be computed by integration over the ray:

$$c(r) = \int_{p_n}^{p_f} e^{-\int_{p_n}^{p} \sigma(r(s))ds} \sigma(r(p))c(r(p))dp. \quad (1)$$

The representation can be extended to the more general case where a field of features with arbitrary size is present by substituting the radiance c with the desired features f.

To allow controllable generation of complex scenes, a compositional strategy is adopted where each object (e.g., player and ball) in the scene is modeled with a dedicated NeRF model. Each radiance field $C_i$ is bounded by its associated 3D bounding box $b^{3D}_i$. The scene is rendered by sampling points independently for each object and querying the respective object radiance field. The resulting values for different objects are sorted before integration based on the distance from the camera origin to produce the final color result.

All objects are assumed to be described by a set of properties whose structure depends on the type of object, e.g., a player, the ball, the background. The following properties also may be considered:

Object location. Each object is contained within an axis aligned bounding box $b^{3D}_i$ which is defined by size and position. In the case of the ball, its velocity is also considered to model blur effects.

Object style. All objects have an appearance that may vary in different sequences, thus a style code $\omega_i$ is introduced as an additional property for all objects. Since it is difficult to define such style information a priori, the style information is assumed to be a latent variable that is learned jointly during training.

Object pose. Articulated objects such as humans require additional properties to model varying poses. The deformation of articulated objects is modeled as a kinematic tree with $J_i$ joints and the rotation R and translation tr parameters associated with each joint are considered as object properties. Further details regarding the deformation model are provided below. For the rest of this description, the object index i will be dropped for the sake of notation simplicity.

Style Encoder

Representing the appearance of each object is challenging since it changes based on the type of object and illumination conditions. The style $\omega$ for each object is treated as a latent variable that is regressed using a convolutional style encoder E 230 (FIG. 2C). Given the current video frame I with O objects 235 (FIG. 2C), 2D bounding boxes $b^{2D}$ are computed for each object. First, a set of residual blocks is used to extract frame features in a feature map that are later cropped around each object according to $b^{2D}$ during training using region of interest (RoI) pooling. Later, a series of convolutional layers with a final projection is used to predict the style code a from the cropped feature maps during inference. The style code $\omega$ is provided to the canonical pose C 240 and the feature enhancer F 290 as illustrated.

Volume Modeling for Efficient Sampling

Radiance fields are commonly parametrized using multilayer perceptrons (MLPs), but such representation may require a separate MLP evaluation for each sampled point, making it computationally challenging to train high resolution models and increasing inference time. To overcome such issues, the radiance field C of each object may be modeled in a canonical space using two alternative parametrizations, depending on the type of represented object.

For three-dimensional objects such as static 3D scene elements and articulated objects, a voxel grid parametrization may be used. Starting from a fixed noise tensor $V' \in R^{F' \times H'_V \times W'_V \times D'_V}$, a series of 3D convolutions and transposed convolutions produces a voxel $V \in R^{F+1 \times H_V \times W_V \times D_V}$ containing the features and density associated to each point in the bounded space. Here, F' and F represent the number of features, while $H_V$, $W_V$, and $D_V$ represent the size of the voxel. Given a point in the object canonical space $x_c$, the associated features and density $\sigma$ may be retrieved using trilinear sampling on V. Predicting the features from a fixed noise grid with a learnable model has been found to result in better geometry and faster convergence with respect to directly optimizing V. To model the different appearance of each object, a small MLP may be adopted that is conditioned on the style o to produce a stylized feature with the help of weight demodulation. Since the density is directly inferred from V, this approach ensures that style information does not alter the geometry of the object.

For two-dimensional objects such as planar scene elements, a similar parametrization based on 2D feature maps may be used. A fixed 2D noise tensor $P' \in R^{F \times H'_P \times W'_P}$ is mapped to a plane of features $P \in R^{F \times H_P \times W_P}$ using a series of 2D convolutions and transposed convolutions. The plane is positioned inside its bounding box and, given ray r, the intersection point x between the plane and the ray is computed. The intersection point x is used to sample P using bilinear sampling and, similarly to the voxel case, a small MLP may be used to model object appearance according to $\omega$. The planes are assumed to be fully opaque and a fixed density value $\sigma$ is assigned to each sample. This representation allows for efficient point sampling since a single point per ray is sufficient to render the object.

Deformation Modeling

Since the radiance field C alone supports only rendering of rigid objects expressed in a canonical space, to render articulated objects such as humans, a deformation model D 250 (FIG. 2C) is introduced that implements a deformation procedure based on linear blend skinning (LBS). Given an articulated object, it is assumed that its kinematic tree is known and that the transformation $[R_j | tr_j]$ from each joint j to the parent joint is part of the object's properties. From these, the kinematic tree can be followed to derive transformations $[R'_j | tr'_j]$ for each joint from the bounding box coordinate system to the canonical coordinate system. Intuitively, these transformations represent how to map a point $x_b$ in the bounding box coordinate system belonging to the joint j to the corresponding point $x_c$ in the canonical space.

Linear Blend Skinning (LBS) establishes correspondences between points in the canonical space $x_c$ and in the deformed bounding box space $x_b$ by introducing blending weights w for each point in the canonical space. These weights can be interpreted as the degree to which that point moves according to the transformation associated with that joint.

$$x_b = \sum_{j=1}^{J} w_j(x_c)\left(R_j'^{-1} x_c - R_j'^{-1} tr_j'\right). \quad (2)$$

During volumetric rendering, however, points $x_b$ in the bounding box space are sampled and the canonical volume in the corresponding canonical space point $x_c$ is queried. Doing so requires solving Equation (2) for $x_c$, which is prohibitively expensive. However, instead of modeling LBS weights w, inverse linear blending weights $w^b$ may be introduced:

$$w_j^b(x_b) = \frac{w_j(R_j' x_b + tr_j')}{\sum_{j=1}^{J} w_j(R_p' x_b + tr_j')}. \quad (3)$$

such that the canonical point can be approximated as:

$$x_c = \sum_{j=1}^{J} w_j^b(x_b)\left(R_j' x_b + tr_j'\right). \quad (4)$$

The function w is parameterized to map spatial locations in the canonical space to blending weights as a neural network. Similarly to the canonical pose C 240, 3D convolutions may be employed to map a fixed noise volume $W' \in R^{F \times H'_W \times W'_W \times D'_W}$ to a volume of blending weights $W \in R^{j+1 \times H_W \times W_W \times D_W}$, where each channel represents the blending weights for each part, with an extra weight modeling the background. The volume channels may be normalized using softmax, so that they sum to one, and can be efficiently be queried using trilinear sampling. To facilitate convergence, the known kinematic tree is exploited to build a prior over the blending weights that increases blending weights in the area surrounding each limb.

Enhancer

NeRF models are often parametrized to output radiance $c \in R^3$ and directly produce an image using Equation (1). However, such an approach struggles to produce correct shading of the objects, with details such as shadows being difficult to synthesize. Also, to improve the computational efficiency of the method, a limited number of points per ray may be sampled that may introduce subtle artifacts in the geometry. To address these issues, the model C is parameterized to output features where the first three channels represent radiance and the subsequent channels represent learnable features. Then, following Equation (1), a feature grid $G \in R^{F \times H \times W}$ and an RGB image $\tilde{I} \in R^{3 \times H \times W}$ are produced. The enhancer network F 290 (FIG. 2C) is introduced, which may be modeled as a UNet architecture interleaved with weight demodulation layers that maps the feature grid G 270 and the style codes o to the final RGB output $\tilde{I} \in R^{3 \times H \times W}$ 280.

Object-Specific Rendering

A compositional approach allows the use of object-specific techniques. In particular, in the case of tennis, dedicated procedures may be applied to enhance the rendering quality of the ball, the racket, and the 2D user interfaces such as the scoreboards. The rendering of the tennis ball is treated specially to render the blur that occurs in real videos in the case of fast-moving objects. The racket can be inserted in a postprocessing stage to compensate for the difficulty of NeRFs to render thin, fast-moving objects. Finally, the user interface (UI) elements may be removed from the scene since they do not behave in a 3D consistent manner. For MINECRAFT®, the scene skybox may be modeled.

The compositional nature of the synthesis module 150 makes it possible to adopt object-specific techniques to model particular objects. Techniques for modeling balls, rackets, 2D UI elements, and skyboxes are described herein as an example. Those skilled in the art will appreciate how to implement object-specific techniques to model other types of objects.

Ball Modeling

Fast-moving objects may appear blurred in real video sequences. This effect is frequent in ball objects found in sports videos, and it is thus desirable to model this effect. To model this effect, a procedure is adopted that distributes multiple rays in time to model blur effects. The object properties of the ball object are extended to also include a velocity vector v. Given the ball radius r and an estimate for the shutter speed $t_c$ of the camera, the probability p can be computed in closed form that a given point in space intersects with the ball object while the ball moves during the time the camera shutter remains open to capture the current frame. To model blur, a fixed density is assigned to each point multiplied by p. Modeling p in closed form avoids the need to sample multiple rays in time, thus improving performance.

Figure 10:
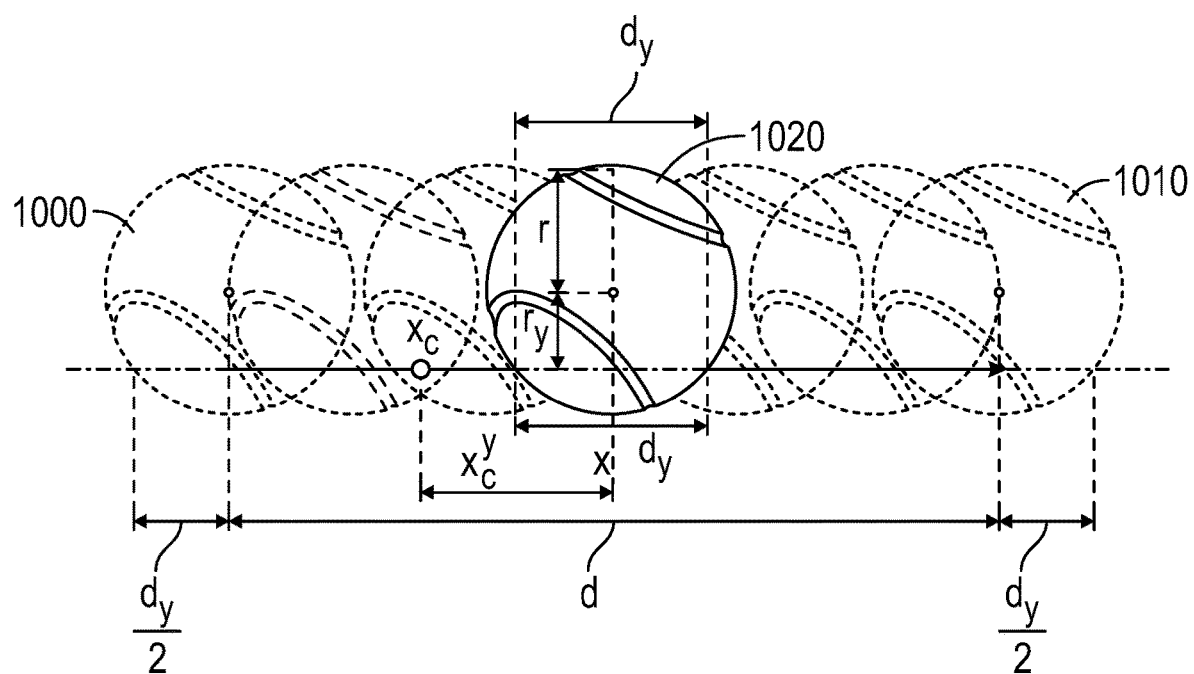
FIG. 10 is an illustration of the quantities involved in the computation of the probability that a ball intersects a certain point in space during a randomly sampled time instant during the capture of a current frame in a sample configuration.

FIG. 10 provides a visualization of the quantities involved in the computation of the probability p that a ball 1020 intersects with a certain point in space during a randomly sampled time instant in the interval from the opening to the closing of the shutter of the camera to capture the current frame. The leftmost ball 1000 and rightmost ball 1010 depict the ball position at the times the camera shutter opens and closes, respectively. For simplicity, the space where the velocity vector of the ball is aligned with the y-axis.

To compute p, the velocity vector v is first used to estimate the rotation $R_b$ that maps each point $x_b$ in the ball bounding box to a canonical space $x_c$ in which the ball velocity vector is aligned to the positive y-axis $x_c = R_b x_b$. The distance traveled by the ball is then computed while the shutter remains open $d = \|v\|_2 t_c$. The useful cross-section of the ball $d_y$ is then computed that can intersect with $x_c$ as the diameter of the circumference originating from the intersection between the ball and a plane with a distance from the ball center $r_y$ equal to the distance of $x_c$ from the y-axis:

$$d_y = \begin{cases} 2r\sin\left(\arccos\left(\frac{r_y}{r}\right)\right) & \text{if } r_y \leq r \\ 0 & \text{otherwise} \end{cases} \quad (5)$$

Finally, p equals the probability that an interval with size equal to the cross-section, positioned in a random portion of space contained inside an interval of size $d+d_y$, that represents the length of the space that has been touched by the ball while the shutter stays open, contains the point $x_c$:

$$p(x_c) = \max\left(0, \min\left(\min\left(\frac{d_y}{d}, 1\right), \frac{1}{2} + \frac{d_y}{2d} - \frac{|x_c^y|}{d}\right)\right), \quad (6)$$

where $x^y_c$ is the y-axis coordinate of $x_c$.

Racket Modeling

Modeling the scene as a composition of neural radiance fields allows applications such as the insertion of user-defined watertight 3D meshes into the scene. To do so, the 3D bounding box for the mesh is defined. Then, the signed distance function (SDF) of the 3D mesh is extracted. To allow fast retrieval of SDF values during rendering, SDF values are sampled along an enclosing voxel grid so that subsequently they can be efficiently retrieved using trilinear sampling. During neural rendering, when a sampled point intersects with the object's bounding box, its SDF function is queried and a fixed, high density is assigned to points that fall inside the object. For simplicity, the object is assumed to have a uniform appearance and a fixed feature vector is assigned to such points. To attach the mesh to an articulated object, the mesh is aligned to its desired position in the object's canonical space, which joint the mesh should move according to is assigned, and blending weights W for the desired joint to have a high value in the region corresponding to the mesh are modified (see Equation (3)).

This technique may be employed on a Tennis dataset to manually insert rackets in the scene that cannot be easily learned since they appear frequently blurred and have no ground truth pose I available. After the synthesis model 150 is trained, this technique may be used to insert a racket mesh in the hand of each player and to configure it to move according to the elbow joint.

When inserting additional objects at inference time, the enhancer model F 290 may introduce artifacts at the contours of the inserted object. For this reason, F 290 may be modified with a masking mechanism that directly uses values from the NeRF-rendered RGB image ˜280 before the enhancer 290 rather than the enhanced image ˆI 280 for pixels corresponding to the inserted object and its contour region.

2D UI Elements

The presence of 2D user interfaces, such as scoreboards, in the training frames may cause artifacts in the final outputs due to attempts of the synthesis model 150 to model these view-inconsistent elements. To address this issue, it may be assumed that the potential regions where such interfaces may be present are known and training patches that intersect with these regions are never sampled. In this way, the synthesis model 150 does not attempt to generate such UI elements and instead models the underlying portion of the 3D scene using data from different views.

Skybox Modeling

The MINECRAFT® background may be represented as a skybox that is modeled by extending the planar object volume modeling mechanism described above. In more detail, the feature plane P is sampled according to the ray's yaw and pitch of the current ray, which can be interpreted as querying points on the surface of a sphere with a radius approaching infinity.

Training

The synthesis model 150 may be trained using reconstruction as the main driving signal. Given a frame I 235 and reconstructed frame ˆI 280, a combination of L2 reconstruction loss and the perceptual loss may be used as the training loss. To minimize the alterations introduced by the enhancer F 290 and to improve view consistency, the same losses between I 235 and ˜I 280 are imposed at the output 270 of the synthesis model 150 before the feature enhancer F 290. All losses are summed without weighting to produce the final loss term. To minimize graphics processing unit (GPU) memory consumption, instead of rendering full images, the losses may be imposed on sampled image patches instead.

All the components of the synthesis model 150 may be trained jointly using a method for stochastic optimization called Adam (e.g., for 300k steps with batch size 32). During training, the learning rate was set to $1e^{-4}$ and exponentially decreased to $1e^{-5}$ at the end of training. A reduced learning rate of $1e^{-5}$ was adopted for the 3D CNNs that model the canonical radiance field voxels V and blending weights W. The framework was trained on videos with 1024×576 pixel (px) resolution.

MINECRAFT® scenes may be modeled considering as objects the player, the scene, and the background. To model Tennis scenes, the two players, the ball, the field plane, and the vertical backplate at the end of the field may be considered to be separate objects. Both players share the same canonical representation. The field and backplate are modeled as planar objects due to the lack of camera translation on the tennis dataset, which does not make it possible to reconstruct the geometry of static objects.

For each ray, 32 points for players, 16 for the ball, 48 for the MINECRAFT® scene, and 1 for all remaining objects that are modeled as planes may be uniformly sampled. Hierarchical sampling was not used as it was empirically found not to improve results. A patch size of 180×180 px and of 128×128 px were employed respectively for the Tennis and MINECRAFT® datasets.

The initial blocks of the style encoder E 230 were modeled as the first two residual blocks of a pretrained residual neural network (e.g., ResNet 18). To prevent players from being modeled as part of the background, images are sampled in pairs from each video and the style codes o of corresponding objects were randomly swapped.

To represent the player canonical radiance fields, a voxel V with F=64 features and $H_V=W_V=D_V=32$ was used. Deformations were represented using blending weights W with $H_W=W_W=D_W=32$. For the MINECRAFT® scene, the size of the voxel V was increased to $H_V=W_V=D_V=128$. The MINECRAFT® skybox was represented with feature planes P with F=64 features and size $H_P=W_P=256$. Due to their increased complexity and variety of styles, in the Tennis dataset feature planes P with F=512 features were adopted. The MLPs performing stylization of the canonical field features were modeled using 2 layers with a hidden dimension of 64, with a final number of output features F=19, where the first 3 channels represent radiance.

Animation Model 120

The animation model 120 is shown in FIG. 2B. The task of the animation model 120 is that of generating sequences of states $s \in S^T$ according to user inputs. The animation model 120 allows users to specify conditioning signals in two forms. First, conditioning signals can take the form of values that the user wants to impose on some object properties in the sequence, such as the player position at a certain time step. This signal is represented by a sequence $s^c \in S^T$. This form of conditioning allows fine control over the sequence to generate but requires directly specifying values of properties. Second, to allow high-level, yet granular control over the sequence, actions are introduced in the form of text $a^c \in L^{A \times T}$ that specify the behavior of each of the A actionable objects at each timestep in the sequence. To maximize the flexibility of the framework, all values in $s^c$ and $a^c$ are considered to be optional. Their respective masks $m^s \in \{0, 1\}^{P \times T}$ and $m^a \in \{0, 1\}^{A \times T}$ are introduced and set to 1 when the respective conditioning signal is present. Elements are assumed where the mask is not set to be equal to 0. The animation model predicts $s^p \in S^T$ conditioned on $s^c$ and $a^c$ such that:

$$s = s^p + s^c, \quad (7)$$

where the entries in $s^p$ and $s^c$ are considered to be mutually exclusive, i.e., an element of $s^p$ is 0 if the corresponding conditioning signal in $s^c$ is present according to $m^s$. The prediction of actions is not necessary since s is sufficient for rendering.

Diffusion models have recently shown state-of-the-art performance on several tasks such as text-conditioned image and video generation, sequence modeling, and text-conditioned human motion generation. Thus, the animation model 120 may be based on the denoising diffusion probabilistic models (DDPM) diffusion framework. Compared to models trained with a pure reconstruction objective, the diffusion framework has been found to better capture the multimodal conditional distribution of states, resulting in sequences with more realistic motions.

A temporal model A 220 is adopted that is based on a non-autoregressive masked transformer design and that leverages the knowledge of a pretrained language model in a text encoder T 210 to model action conditioning information. The masked design provides support for the optional conditioning signals and is trained using a masked sequence modeling training procedure, where $m^s$ and $m^a$ are sampled according to various strategies that emulate desired inference tasks and impose losses on the masked part of the sequence.

The following description provides an overview of diffusion models, a definition of the text encoder, a description of the diffusion backbone, and the training procedure.

Diffusion Models

An illustration of the diffusion-based animation model 120 is shown in FIG. 2B. Diffusion models are a class of generative models that approximate a data distribution via a data-denoising formulation. In the present case, the distribution of environment states $s^p_0 \sim q(x_0)$ are modeled, where the index indicates the diffusion timestep. In a forward process, K random Gaussian noises $\epsilon_1, \ldots, \epsilon_K$ are gradually added to the original data point $s^p_0$ to obtain a sequence $s^p_1, \ldots, s^p_K$ of noisy data points, one for each diffusion timestep k. A neural network 245 (FIG. 2B) is trained to estimate from a noisy data point $s^p_k$ 255 the corresponding noise $\epsilon_k$. After training, new data points can be obtained by following the reverse process that samples a normal distribution and gradually denoises the sample 255 using the trained noise estimator network. Diffusion models can easily be extended to support conditional data distributions $s^p_0 \sim q(s^p_0|c)$ by adding the conditioning information c as an additional input to the noise estimation neural network 245.

Text Encoder

A text encoder T 210 (FIG. 2B) encodes textual actions into a sequence of fixed-size text embeddings:

$$a^{emb} = T(a^c) \in R^{A \times T \times N_t}, \quad (8)$$

where $N_t$ is the size of the embedding for the individual sentence. Given a textual action, a pretrained T5 text model $T_{enc}$ is leveraged that tokenizes the sequence and produces an output feature for each token. Successively, a feature aggregator $T_{agg}$ modeled as a transformer encoder may produce the aggregated text embedding from the text model features. To retain existing knowledge into $T_{enc}$, it is kept frozen and only the feature aggregator $T_{agg}$ is trained.

Temporal Modeling

The temporal model A 220 (FIG. 2B) predicts the sequence of states s conditioned on known state values $s^c$, action embeddings $a^{emb}$, and the respective masks $m^s$ and $m^a$. Since only unknown (masked) state values need to be predicted, the animation model 120 predicts $s^p$ and the complete sequence of states is obtained as $s = s^p + s^c$, following Equation (7). The DDPM diffusion framework is followed to frame the prediction of $s^p = s^p_0$ as a progressive denoising process $s^p_0, \ldots, s^p_K$, where the diffusion timestep index $k \in 0, \ldots, K$ is introduced. The temporal model A 220 acts as a noise estimator that predicts the Gaussian noise $\epsilon_k$ in the noisy sequence of unknown states $s^p k$ at diffusion timestep k:

$$\epsilon^p_k = \mathcal{A}(s^p_k | s^c, a^{emb}, m^s, m^a, k). \quad (9)$$

Entries are always kept in $s^p_k$ at 0 where the corresponding conditioning signal $s^c$ is present according to $m^s$, so that the entries in $s^p_k$ and $s^c$ are always mutually exclusive.

The temporal model A 220 may be realized using a transformer encoder. To prepare the transformer's input sequence, linear projection layers P may be employed. Since each object property may have a different number of features, the projection layers may have separate weights for each property. Several options are possible to aggregate $s^p_k$ and $s^c$. Rather than concatenating them along the time dimension, they may be concatenated along the feature dimension before the projection since the entries in the two sequences are mutually exclusive. This allows the transformer's sequence length to remain smaller and enables the projection layers to easily distinguish between noisy sequence entries and conditioning signals, based on the position of the non-zero entries in the features dimension. An analogous projection may be performed for $a^{emb}$ and, subsequently, the projection outputs for states and actions may be concatenated into a single sequence $e \in R^{P+A \times T \times E}$, which constitutes the input to the transformer. To favor generalization to sequences of different lengths at inference time, relative positional encodings may be adopted that specify positional encodings based on the relative distance in the sequence between sequence elements. An output projection layer with separate weights for each object property produces the prediction $\epsilon^p_k$ at the original dimensionality.

To condition the model on the diffusion time-step k, a weight demodulation layer may be introduced after each self-attention and feedforward block. Additionally, to enable the animation model 120 to better distinguish between noisy sequence entries and conditioning signals, it is beneficial to condition also on $m^s$ and $m^a$ using the same weight demodulation layer.

To model long sequences while keeping reasonable computational complexity and preserving the ability to model long-term relationships between sequence elements, it may be desirable to build the sequences using states sampled at a low framerate. However, this strategy does not allow the model to generate content at the original framerate and prevents it from understanding dynamics such as limb movements that are clear only when observing sequences sampled at high framerates. To address this issue, the weight demodulation layers may be used to further condition the animation model 120 on the sampling framerate v to enable a progressive increase of the framerate at inference time.

For example, at inference time, the user may be presented with a fully-masked, empty sequence $s^c=0$, $m^s=0$, $a^c=$" ", $m^a=0$. Any object property can be specified as a conditioning signal in $s^c$ and text action descriptions for any sequence timesteps can be provided in $a^c$, with masks updated accordingly. The desired framerate v also may be specified.

The text encoder T 210 produces text embeddings $a^{emb}$ as in Equation (8). Successively, the reverse process is started at diffusion time k=K, with $s^p_K$ sampled from the normal distribution. The DDPM sampler may query the temporal model according to Equation (9) to progressively denoise $s^p_k$ and obtain the predicted sequence $s^p=s^p_0$. The final sequence is obtained as $s=s^p+s^c$, following Equation (7).

To produce sequences at the dataset framerate, a two-stage sampling procedure was devised that was designed to prevent an excessive increase in the sequence length. In the first stage, the desired sequence was sampled at a low framerate $v_1$. In the second stage, the masking mechanism and framerate conditioning were exploited to increase the framerate and, consequently, the length of the generated sequence. After the first stage, a higher framerate $v_2$ was considered and the sampled sequence s was extended with new states between existing ones, called keyframes, until the sequence length corresponding to $v_2$ was reached. This sequence constitutes the new $s^c$. Any previous action conditioning is copied in a new $a^c$ in the corresponding keyframe locations. Masks are updated to be 1 in the position of the keyframes and 0 elsewhere. The sampling process is then repeated with the new conditioning signals and a sequence s is produced at the final framerate $v_2$. To avoid an explosion in the length of the sequence, keyframes were exploited to divide the sequence into shorter chunks beginning and terminating at a keyframe, and sampling was performed separately on each chunk.

The masking mechanism also can be used to produce predictions autoregressively, enabling long sequence generation. Autoregressive generation can be obtained by considering a sequence $s^c$ and removing the states corresponding to the first t timesteps. t timesteps are then added at the end of the sequence and a mask $m^s$ is created to zero out these additional t steps. Conditioning signals then can be specified as desired for the last t timesteps. When sampling $s^p$, a prediction is produced for the additional timesteps and the procedure can be repeated.

Training

To train the animation model 120, a sequence s with corresponding actions a is sampled from a video in the dataset at a uniformly sampled framerate v. Successively, masks $m^s$ and $m^a$ are obtained according to the masking strategies described below. The sequence for training is obtained following $s^p_0=s\odot(1-m^s)$ and $s^c=s\in m^s$, and actions as $a^c=a\odot m^a$, where a denotes ground truth actions and $\odot$ the Hadamard product.

The masks $m^s$ and $m^a$ are created by randomly selecting one of the following masking strategies:
 i. randomly mask each sequence element with a probability 0.25;
 ii. randomly mask each sequence element with a probability 0.5;
 iii. mask all sequence elements corresponding to a block of consecutive timesteps of random length;
 iv. the complement of (iii);
 v. mask all sequence elements corresponding to the last timesteps of the sequence; or
 vi. mask all sequence elements corresponding to a randomly chosen set of object properties.

With probability 0.5, $m^a$ is set to 1, excluding actions from the masking operation, so that the animation model 120 can learn to solve (ii), (iii), (iv) also in the scenario where text guidance is provided. The masking strategies are designed to mimic masking configurations that are relevant to inference problems such as autoregressive generation (v), unconditional generation (vi), generating opponent responses to user actions (vi), sequence inpainting (iii), sequence outpainting (iv), and framerate increase (iii).

The animation model 120 is trained by minimizing the DDPM training objective:

$$\mathbb{E}_{k,\epsilon\sim N(0,I)}\|\epsilon^p_k - \epsilon_k\|, \qquad (10)$$

where the diffusion timestep k is uniformly sampled, and $\epsilon^p_k$ is the noise estimated by the temporal model A 220 according to Equation (9). The loss is not applied to positions in the sequence corresponding to conditioning signals.

The animation model 120 may be trained using the Adam stochastic optimization optimizer with a learning rate of 1e-4, cosine schedule, and with 10,000 warmup steps. In a training example, the animation model 120 was trained for a total of 2.5M steps and a batch size of 32. The length of the training sequences was set to T=16. The number of diffusion timesteps was set to K=1000 and a linear noise schedule was adopted.

For the text encoder, $T_{enc}$ was modeled as a frozen T5-Large model and $T_{agg}$ as a transformer encoder with 4 layers, 8 heads, and a feature size of 1024. For each sequence, the output $a^{emb}$ of T was the transformer encoder output corresponding to the position of the end-of-sentence token in the input sequence. Mean pooling and a learnable class-token were used with comparable results. Alternative choices for $T_{enc}$ (T5-Small, T5-Base and the CLIP text encoder) were found to underperform T5-Large.

For the temporal model A 220, a transformer encoder was employed having 12 layers, 12 heads, and 768 features. Embeddings were produced for the diffusion timestep k and framerate v using sinusoidal position encodings.

In sample configurations for the Tennis dataset, the temporal model A 220 receives a flattened sequence of object properties grouped and encoded as follows: the position of objects as the bounding box center point; the player poses expressed with joint translations and rotations separately, with rotations expressed in axis-angle representation, which were found to produce more realistic animations with respect to a 6D representation; and the ball speed vector expressed as its orientation in axis-angle representation and norm. Separating positions from joint translations and rotations has the practical implication that these properties can be independently used as conditioning signals during inference. This enables applications such as generating realistic joint rotations and translations given a sequence of object positions in time describing the object movement trajectory. The style is assumed to remain constant in the sequence and thus was not included as input to the animation model 120.

Applications

The Learnable Game Engine 100 described herein enables a series of applications that are unlocked by its expressive state representation, the possibility to render it in a controllable way using a 3D-aware synthesis model 150, and the ability to generate sequences of states with an animation model 120 that understands the game logic and can be conditioned on a wide range of signals, including high-level yet fine-grained textual actions. A set of selected applications are demonstrated in FIGS. 3-9.

Figure 3:
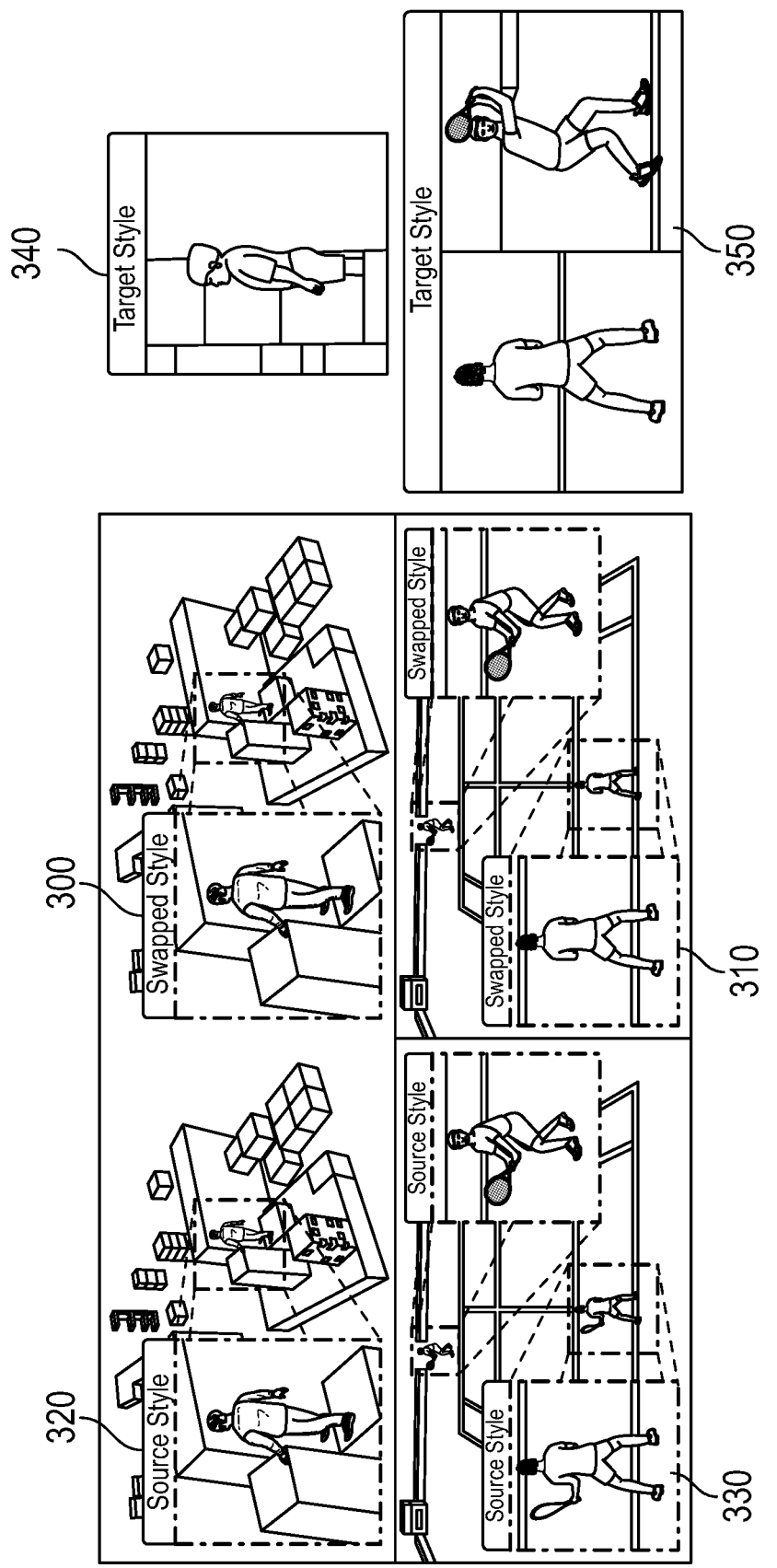
FIG. 3 is an illustration depicting style swap results using the LGE in a sample configuration.

The state representation is modular, where the style is one of the components. FIG. 3 is an illustration depicting style swap results using the LGE in a sample configuration. In FIG. 3, the style of the player w in the original image is swapped with the style from a target image using images in the MINECRAFT® (top) and Tennis (bottom) datasets. The center images 300 and 310 with the swapped style are formed by swapping the style code o for the players on the leftmost images 320, 330 with the styles from the rightmost images 340, 350. The MINECRAFT® results are cropped for better visualization.

Figure 4:
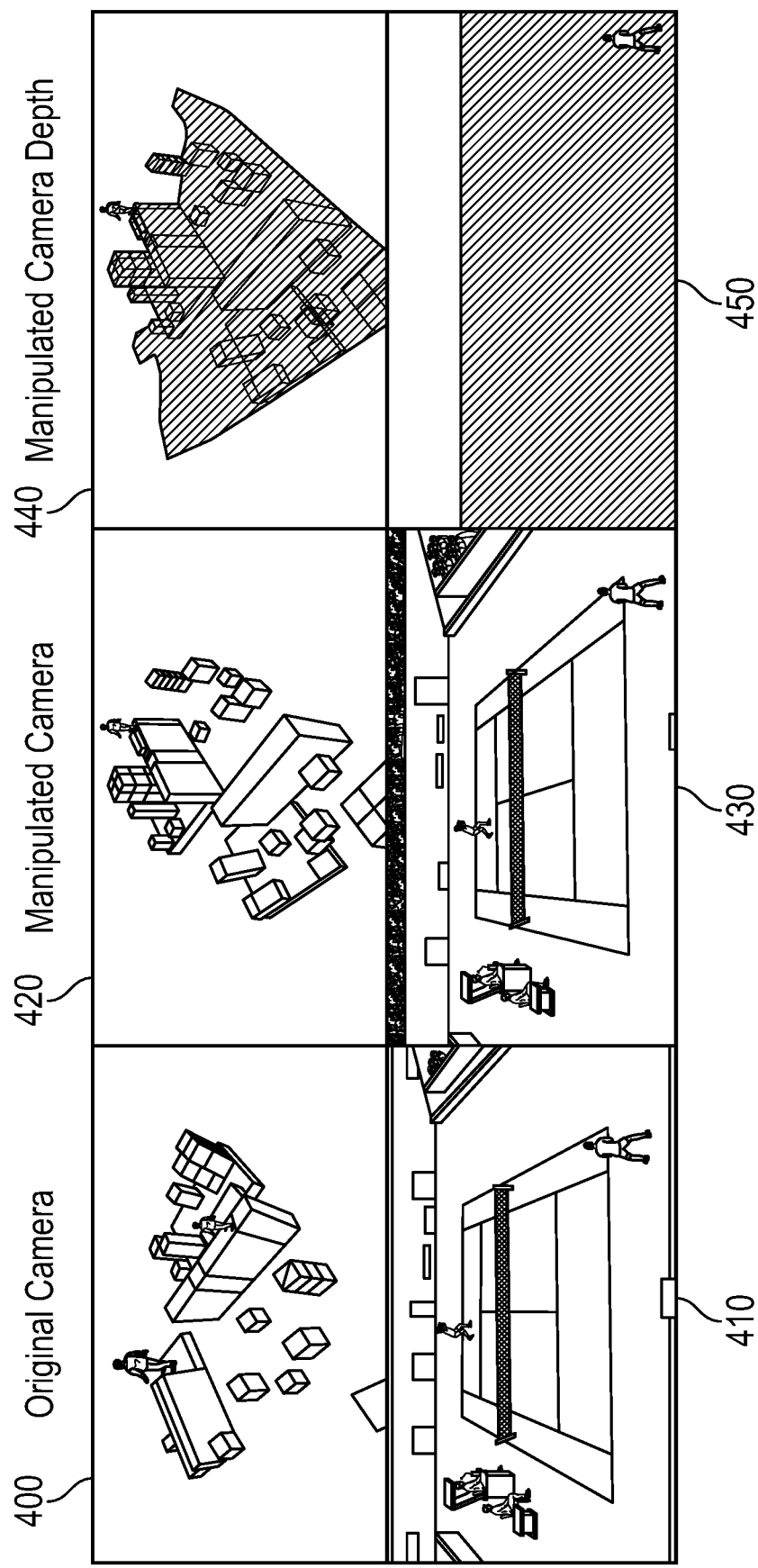
FIG. 4 is an illustration depicting camera manipulation results using the LGE in a sample configuration.

Similarly to the rendering component of a game engine, the synthesis model 150 renders the current state of the environment from a user-defined perspective. This enables the LGE 100 to perform novel view synthesis as shown in FIG. 4. FIG. 4 illustrates camera manipulation results on the MINECRAFT® (top) and Tennis (bottom) datasets for the original camera images 400, 410 and the manipulated camera images 420, 430. The manipulated camera depth for the MINECRAFT® dataset is shown at 440; however, as shown at 450, the lack of camera translation on the Tennis dataset does not allow capture of the 3D geometry of static objects, which is replaced by a prior. The MINECRAFT® results are cropped for better visualization.

Figure 5:
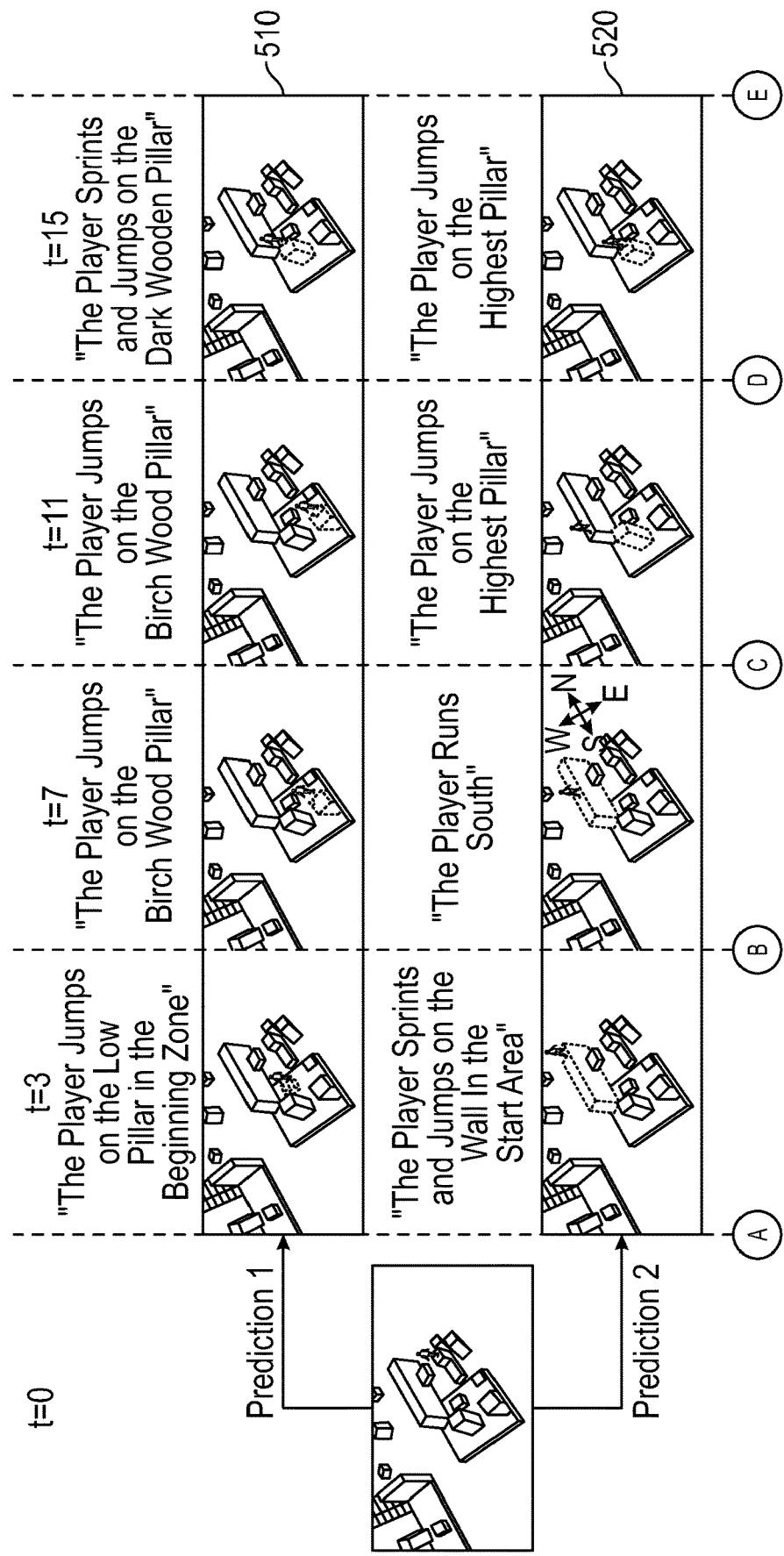
FIG. 5 is an illustration depicting different game sequences altered by text conditioning in a sample configuration.
Figure 5:
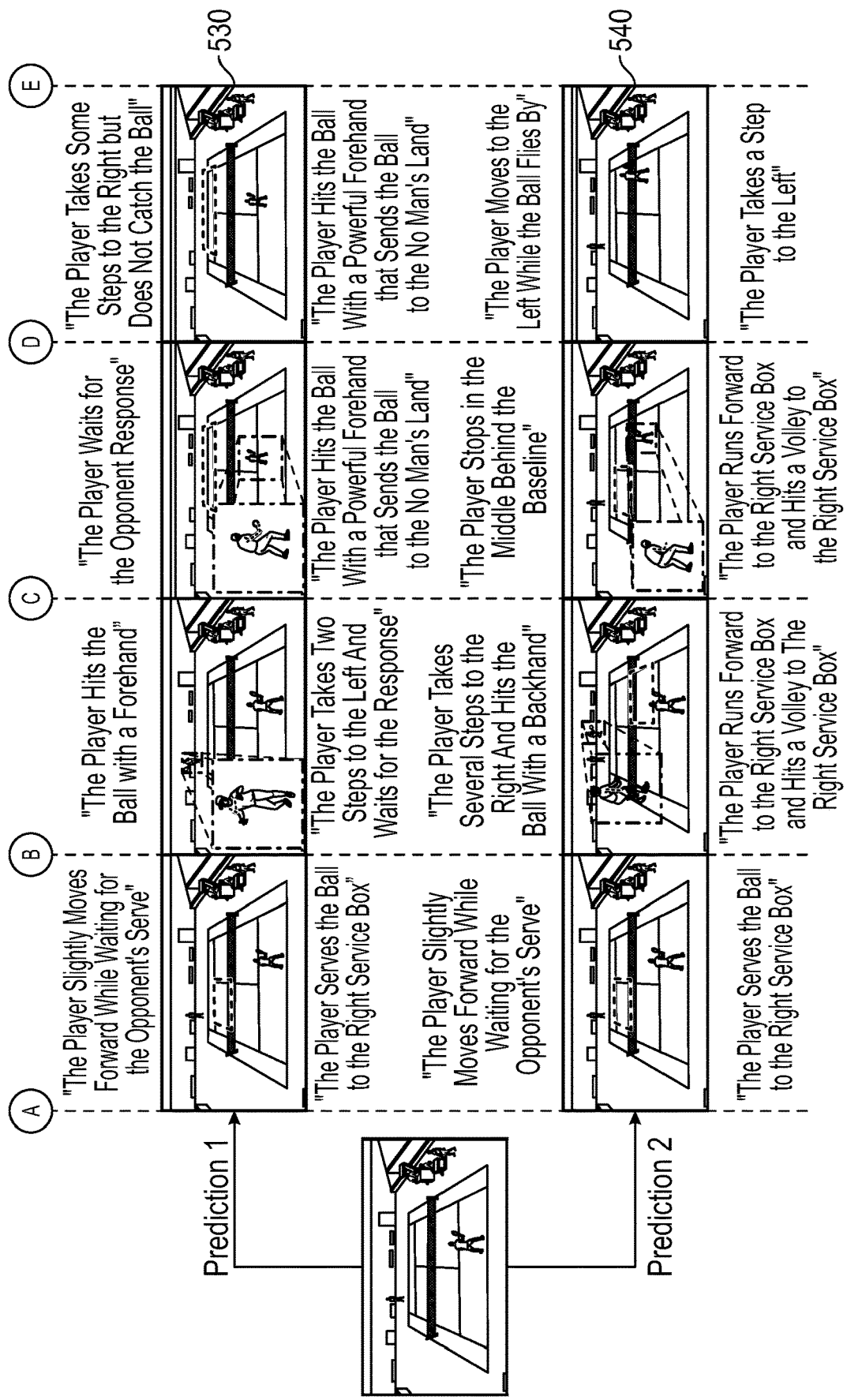

A set of applications enabled by the animation model 120 is shown in FIG. 5. In FIG. 5, different sequences 510, 520 predicted on the MINECRAFT® dataset (top) and different sequences 530, 540 predicted on the Tennis dataset (bottom) are illustrated starting from the same initial state where the text conditioning is then altered by textual statements. As shown, the animation model 120 moves players and designates shot targets using domain-specific referential language (e.g. "right service box", "no man's land", "baseline") based on the different predictions. The animation model 120 supports fine-grained control over the various tennis shots using technical terms (e.g., "forehand", "backhand", "volley"). In FIG. 5, not only can the model understand subtle variations in how an action such as hitting the ball can be performed (e.g., "forehand", "backhand", "volley"), but also referential language can be used to specify which object in the scene is the target of the action, such as where to jump (e.g., "the birch wood pillar", "the highest pillar", "the low pillar in the beginning zone") or where to aim the shot (e.g., "right service box", "no man's land"). These capabilities are learned from textual descriptions alone.

The animation model 120 is not limited to generating sequences given step-by-step actions. Thanks to its understanding of the game's logic, the animation model 120 also can tackle more complex tasks such as modeling an opponent against which a user-controlled player can play against (FIG. 6) or even controlling all players in a scene without user intervention (FIG. 7), in a way similar to a traditional game engine's "game AI".

Figure 6:
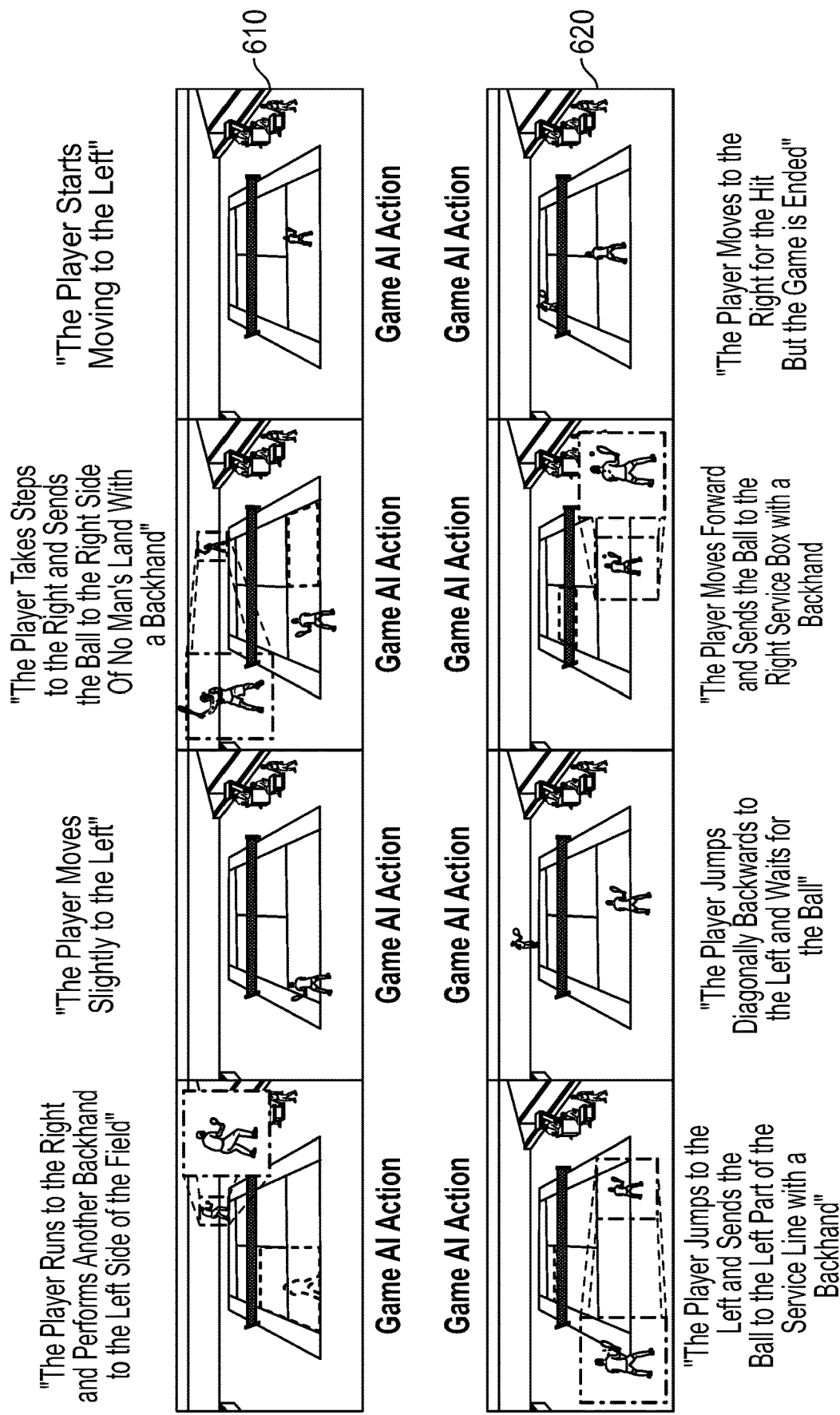
FIG. 6 is an illustration depicting sequences generated by specifying actions for one of the players and letting the model act as the game artificial intelligence that takes control of the opponent in a sample configuration.

For example, in FIG. 6, sequences generated by specifying actions for one of the players and letting the model act as the game AI and take control of the opponent are shown. The game AI successfully responds to the actions of the player by running to the right (see top sequence 610) or towards the net (see bottom sequence 620), following two challenging shots of the user-controlled player.

Figure 7:
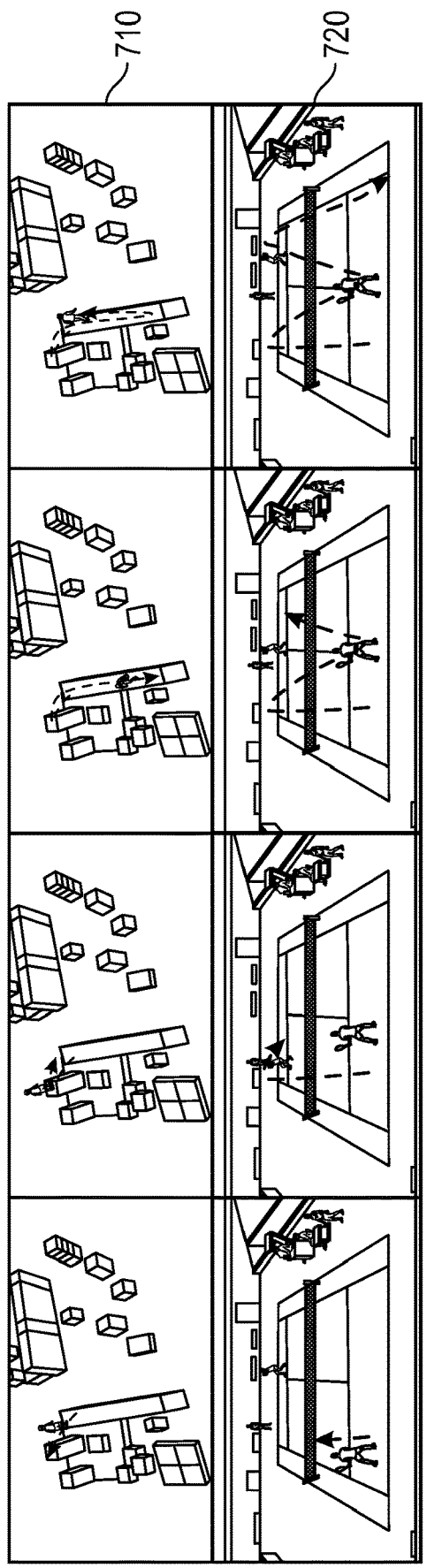
FIG. 7 is an illustration depicting sequences without any user conditioning signal where the actions of all players are controlled by the model that acts as the game artificial intelligence in a sample configuration.

FIG. 7 is an illustration depicting sequences without any user conditioning signal where the actions of all players are controlled to adjust trajectories based on instructions from the animation model 120, which acts as the game artificial intelligence in a sample configuration. As shown for the MINECRAFT® (top) dataset 710, the player jumps between scene elements and crouches. In the Tennis (bottom) dataset 720, the players produce a realistic exchange, with the bottom player advancing aggressively toward the net and the top player defeating him with a shot along the right sideline. The MINECRAFT® player and tennis ball trajectories are highlighted for better visualization.

Figure 8:
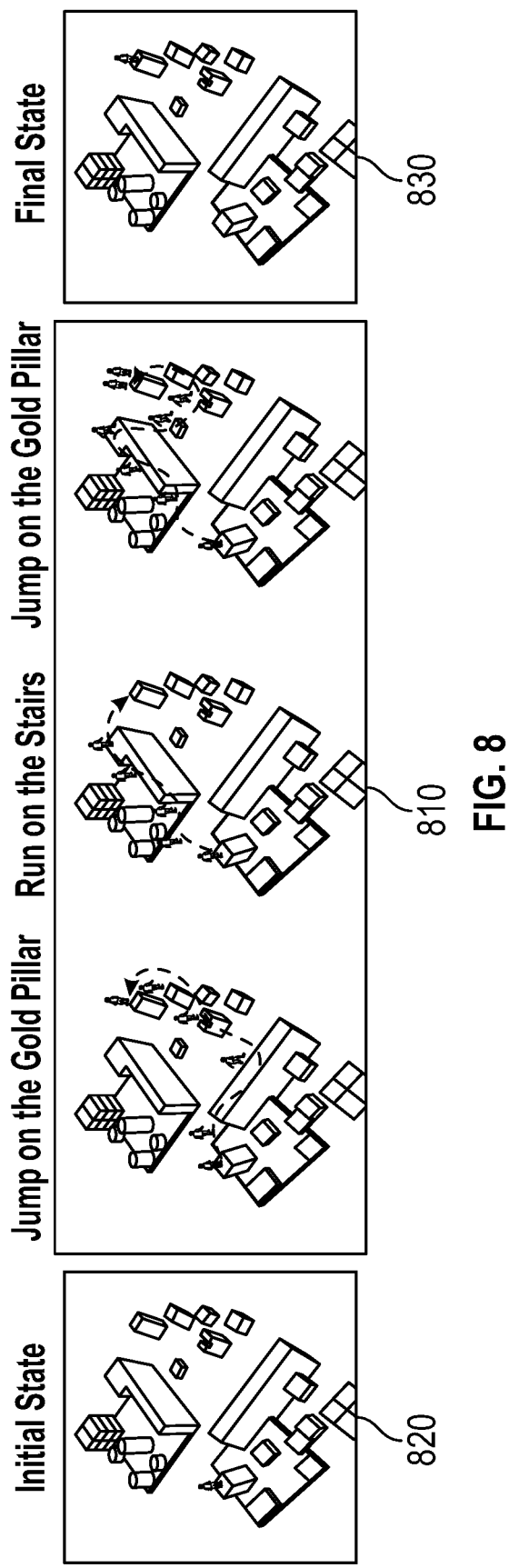
FIG. 8 is an illustration depicting the generation of intermediate states between an initial and final state where different actions indicate the desired intermediate waypoints in a sample configuration.

The animation model 120 also unlocks the "director's mode", where the user can generate sequences by specifying a desired set of high-level constraints or goals. The animation model 120 may reason on actions to find a solution satisfying the given constraints. For example, FIG. 8 is an illustration depicting the generation of intermediate states (trajectories) 810 between an initial state 820 and final state 830 where different actions indicate the desired intermediate waypoints in a sample configuration. Given an initial state 820 and final state 830, all the states 810 in between are generated. The generation is repeated multiple times conditioning it using different actions indicating the desired intermediate waypoints. In FIG. 8, the user also may constrain the solution on intermediate waypoints that can be specified by means of a natural language action such as that the player should "jump on the gold pillar" in the middle of the sequence. Multiple waypoints can be specified, enabling the generation of longer and more complex paths.

Figure 9:
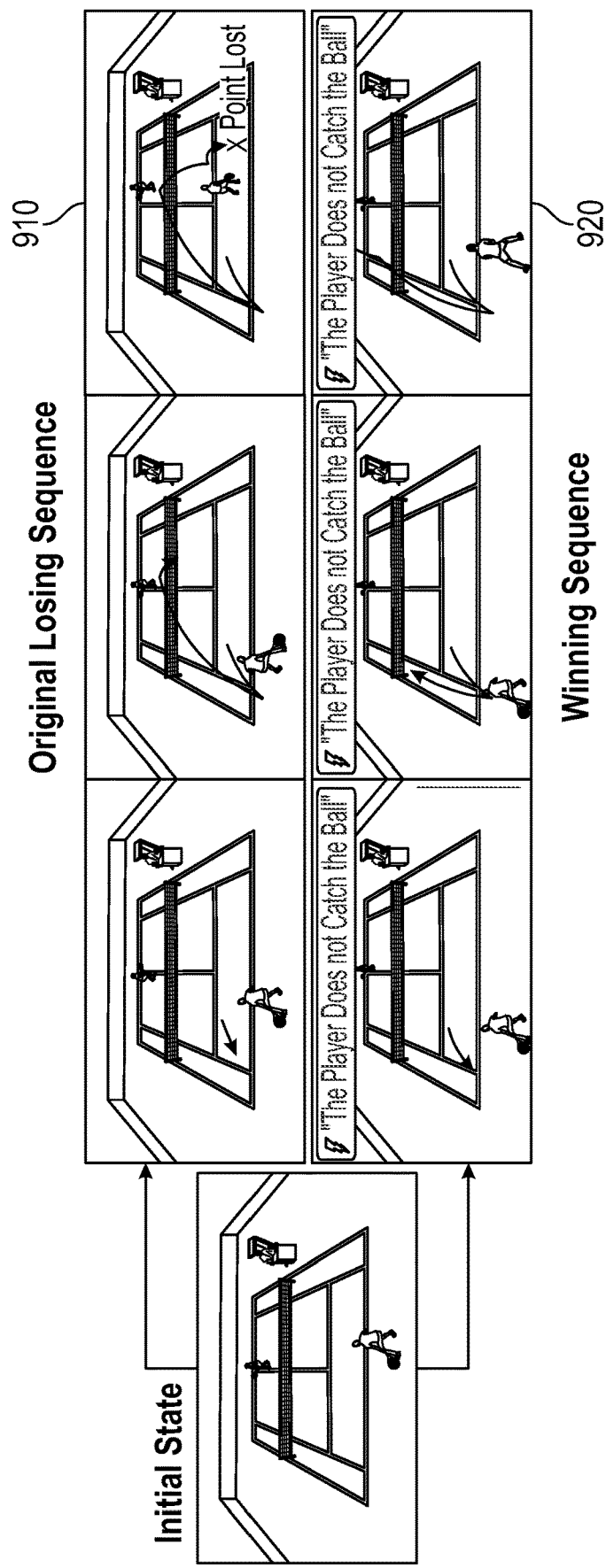
FIG. 9 is an illustration where sequences in which the bottom player loses is modified such that the bottom player instead wins by conditioning the top player with a particular action in a sample configuration.

FIG. 9 is an illustration where sequences in which the bottom player loses is modified such that the bottom player instead wins by conditioning the top player with a particular action in a sample configuration. Given a sequence where the bottom player loses (see top sequence 910), the user asks the animation model 120 to modify the sequence such that the bottom player wins instead (see bottom sequence 920). To do so, the top player is conditioned on the action "The player does not catch the ball" for all timestamps. While in the original sequence 910 the bottom player aims its response to the center of the field where the opponent is waiting, the animation model 120 in the modified sequence 920 successfully generates a winning set of moves for the bottom player that sends the ball along the left sideline, too far for the top player to reach.

Thus, in the example of FIG. 9, the animation model 120 is shown to be capable of devising strategies to defeat an opponent. Given an original sequence where the player commits a mistake and loses, the animation model 120 can devise which actions the player should have taken to win. This can be achieved by considering an initial state preceding the mistake and conditioning the opponent player on the action "The player does not catch the ball." These model capabilities are learned by just observing sequences annotated with textual actions.

Evaluation

The Tennis and MINECRAFT® datasets will now be described as well as the experimental protocol. An evaluation of both the synthesis model 150 and the animation model 120 will also be provided.

Datasets

Two datasets were collected to evaluate the methods described herein. Their structure and the annotations available are described below.

Tennis Dataset

A dataset of broadcast tennis matches is collected starting from videos. The dataset depicts matches between two professional players from major tennis tournaments, captured with a single, static bird's eye camera. Each video in the dataset is trimmed to only include portions of videos where actual playing is taking place.

To enable the construction of LGEs 100, a wide range of annotations are collected with a combination of manual and automatic methods:

- For each frame, perform camera calibration;
- For each of the two players, perform tracking and collect full skinned multi-person linear (SMPL) body parameters. The methods described herein only use a subset of the parameters: rotation and translation associated with each joint, and the location of the root joint in the scene. In addition, 2D bounding boxes are extracted during the computation of SMPL parameters.
- For each player and frame, manually annotate textual descriptions of the action being performed. Captions are structured so that each includes information on where and how the player is moving, the particular type of tennis shot being performed during hitting actions, and the location where the shot is aimed. Captions make use of technical terms to describe shot types and field locations. In contrast to other video-text datasets that contain a single video-level or high-level action descriptions weakly aligned with video content, the captions in the dataset are separate for each object and constitute a fine-grained description of the actions taking place in the frame.
- For the ball, perform 3D tracking and provide its position in the scene and its velocity vector indicating the speed and direction of movement. 2D bounding boxes are also estimated for the ball.

For example, a non-curated set of captions extracted from the Tennis dataset may include:
- "the player prepares to hit the ball but stops, opponent hits the net"
- "the player starts to move to the left when the opponent sends the ball out of the field"
- "the player moves diagonally to the right and forward to the right side of the baseline and sends the ball to the right side of no man's land with a forehand"
- "the player takes sidestep to the right and hits the ball with a backhand that sends the ball to the right side of the no man's land"
- "the player moves left to hit the ball but stops halfway"
- "the player sidesteps to the left and stops, because the ball goes out of bounds"

A set of peculiar words extracted from the set of words with the lowest frequency on the Tennis dataset may include the following: "scratching", "inertia", "previously", "realize", "understands", "succeed", "bind", "touched", "circling", "approaching", "bolting", "entering", "ducks", "reaction", "repeat", "wipes", "abruptly", "preparation", "dramatic", "soft", "celebrating", "losing", "strides", "dart", "reacts", "block", "sideway", "ending", "becomes", "dismissively", "continuous", "squat", "says", "intends", "ricochet", "delays", "night", "guess", "manage", "already", "correctly", "anticipation", "unsuccessfully", "inaccurate", "deflection", "properly", and "swinging".

The Tennis dataset was built starting from an original dataset that has an imprecise camera calibration and lacks information such as 3D player poses and 3D localization of the ball. Thus, only the original videos were retained and new annotations were acquired. To improve camera calibration, the original dataset bases its camera calibration on field keypoints, but such keypoint estimates are noisy. To overcome this issue, a subset of 10569 frames were manually annotated with field keypoint information and a keypoint detection model was trained, which was chosen due to its reduced memory footprint that allows the model to be trained in full 1920×1080 px resolution for best results. The detected keypoints were filtered and used to produce camera calibration.

To produce 3D ball localization, a 2D ball detector was built following the same approach used for field keypoints localization, starting from 17330 manually annotated frames. In addition to 2D ball localization, the projection of the ball was annotated on the field plane for a set of keyframes defined as the frames where contact between the ball and an object different than the field happens or the first and last frames of the video with a visible ball. The field plane projections of the ball in conjunction with the camera calibration results and 2D ball detections can be used to recover the 3D ball position in those frames.

Between the keyframes, it is assumed that no contact happens that significantly alters the horizontal speed of the ball apart from air drag. In practice, contact between the ball and the field during bounces does affect ball speed, which can be accounted for in a second, refinement phase. The horizontal ball position is thus modeled on the line between the ball positions at two consecutive keyframes by solving the linear motion equation under air drag:

$$x(t) = x_0 \frac{\log(1 + Cv_0 t)}{C}, \tag{11}$$

where $x_0$ is the initial position, $v_0$ is the initial velocity, t is time and C is an estimated coefficient summarizing fluid viscosity, drag coefficient, and shape of the ball. The effects of gravity are ignored in the equation. C can be estimated by inverting Equation (11), based on initial ball speed measurements for $v_0$ that can be extracted from the videos thanks to the service ball speed radars installed on tennis fields, and the positions of the ball at keyframes. Given the ball's horizontal position on the line joining the 3D ball position at the preceding and succeeding keyframes, its 3D position can be recovered by intersecting the camera ray passing from the 2D projection of the ball on that frame with the plane parallel to the net that intersects with the ball's horizontal position.

To improve the precision of results and account for horizontal ball speed changes during bounces, in a second phase bounces between the ball and the field are detected and it is imposed that the ball touches the field at those positions, by considering them as additional keyframes and repeating the procedure. Finally, to calibrate frames with missing 2D ball detections (e.g., ball thrown high above the camera frames or heavy blur and image compression artifacts), the ball position is recovered by fitting a ballistic trajectory using 3D ball localization from neighboring frames.

To recover 3D player poses, the 3DCrowdNet pose estimator was used as it has been found to be robust to the presence of frequent overlaps between players and referees, player limbs blur, and low player resolution. 3DCrowdNet assumes 2D joint locations to be given as input, so they are produced using the state-of-the-art 2D pose estimator Vit-Pose, which has been found to be robust to blur, reduced player size, and occlusions. However, the extracted 3D skeletons are expressed under the coordinate system of a framework-predicted camera. A perspective-n-point (PnP) procedure may be used to register the 3D skeletons to the calibrated camera and reduce depth estimation errors by placing the estimated 3D skeletons with their feet touching the ground. While 3DCrowdNet regresses full SMPL parameters and meshes, the system only makes use of 3D joint locations and joint angles. SMPL body shape parameters nevertheless may be included in the dataset to support its different use cases.

Each video sequence is manually annotated using a text caption for each player and frame. Each caption focuses on the action being performed by the player in that instant and captures several aspects of the action. The caption captures where the player is moving and how the player is moving, i.e., the player is running, walking, sliding, or falling, the player is moving to its left, towards the net, across the baseline. When a player is performing a ball-hitting action, the particular type of tennis shot being performed is presented, e.g., a smash, a serve, a lob, a backhand, a volley, and the location where the ball is aimed is described. Sample text annotation statistics are shown in Table 1.

TABLE 1

Dataset statistics for the Tennis and Minecraft datasets.

|  | Tennis | Minecraft |
| --- | --- | --- |
| Sequences: | 7112 | 61 |
| train | 5690 | 51 |
| validation | 711 | 5 |
| test | 711 | 5 |
| Duration: | 15.5 h | 1.21 h |
| train | 12.4 h | 0.952 h |
| validation | 1.59 h | 0.16 h |
| test | 1.52 h | 0.101 |
| Annotated frames: | 1.12M | 68.5k |
| train | 1.05M | 64.5k |
| validation | 135k | 11.2k |
| test | 130k | 7.06k |
| Resolution | 1920 × 1080 px | 1024 × 576 px |
| Framerate | 25 fps | 20 fps |
| Captions | 84.1k | 818k |
| of which unique | 25.5k | 1.24k |
| Unique words | 915 | 117 |
| Avg. words | 13.8 | 5.85 |
| Avg. span | 1.32 s | 0.500 s |
| Parts of sentence: |  |  |
| Nouns | 32.3% | 36.2% |
| Verbs | 11.9% | 17.4% |
| Adjectives | 3.08% | 6.48% |
| Adverbs | 2.70% | 11.7% |
| Pronouns | 0.18% | 0.00% |
| Articles | 26.4% | 8.09% |
| Prepositions | 7.89% | 6.98% |
| Numerals | 0.11% | 0.03% |
| Particles | 9.28% | 1.50% |
| Punctuation | 1.76% | 1.12% |
| Others | 0.00% | 0.00% |

The UI elements of each video sequence were manually annotated with a set of 2D bounding boxes indicating the places where 2D UI elements such as scoreboards or tournament logos may appear during the sequence.

In a sample configuration, 7112 video sequences in 1920×1080 px resolution and 25 fps were collected starting from videos in the original dataset for a total duration of 15.5 hours. The dataset features 1.12M fully-annotated frames and 25.5k unique captions with 915 unique words. Statistics of the dataset are shown in Table 1 above.

It is noted that broadcast Tennis videos are monocular and do not feature camera movements other than rotation, thus the dataset does not make it possible to recover the 3D geometry of static objects. Unless otherwise specified, the models were trained in 1024×576 px resolution on this dataset.

MINECRAFT® Dataset

A synthetic dataset was collected from the MINECRAFT® video game. This dataset depicts a player performing a series of complex movements in a static MINECRAFT® world that include walking, sprinting, jumping, and climbing on various world structures such as platforms, pillars, stairs, and ladders. A single, monocular camera that slowly orbits around the scene center is used to capture the scenes. A range of synthetic annotations was collected using a game add-on including:

Camera calibration for each frame

Player rotation and translation parameters associated with each joint in the kinematic tree format adopted by the game engine. The location of the root joint in the scene and 2D bounding boxes were also collected.

A synthetically-generated text caption describing the action being performed by the player was provided. varied, descriptive names were assigned to each element of the scene and captions were built that describe scene elements or directions towards which the player is moving. Additionally, the synthetic captions captured how movement is happening, i.e. by jumping, sprinting, walking, climbing, or falling. A stochastic caption generation procedure was adopted that generates multiple alternative captions for each frame.

A non-curated set of captions extracted from the MINECRAFT® dataset may include:

"the player falls on the birch pillar"
"the player moves fast north, jumps"
"the player jumps on the intermediate wooden pillar"
"the player falls on the platform opposite to the stairs"
"the player runs to the big stone platform"
"the player climbs down and does not rotate"
"the player moves south east, jumps and rotates counter-clockwise"
"the player runs to the red decorated block"

A set of peculiar words from the MINECRAFT® dataset include the following: "nothing", "facing", "space", "level", "map", "leading", "opposite", and "edge".

A total of 61 videos were collected in 1024×576 px resolution and 20 fps for a total duration of 1.21 hours. The dataset contains 68.5k fully annotated frames and 1.24k unique captions with 117 unique words. Statistics for the dataset are provided in Table 1 above.

For the MINECRAFT® dataset, a skeletal player representation was adopted that divides the MINECRAFT® body into 6 parts: head, torso, left and right arm, and left and right leg. Six corresponding joints were placed at the bottom of the head, top of the torso, shoulders, and top of the legs. Following the internal MINECRAFT® skeletal representation, a root joint was added that is the parent of the 6 joints. This representation was extended by introducing 6 additional joints at the top of the head, top of the torso, bottom of the arms, and bottom of the legs. The additional joints have as parents the original joint positioned on the same body part. While the 6 additional joints are always associated with a zero rotation, their introduction was found to be convenient for skeleton visualization purposes.

The main dataset statistics are provided in Table 1, which plots the distribution of video lengths in the dataset and the average number of words in each caption. The Tennis dataset features manually-annotated captions which contain a greater number of words with respect to the synthetic annotations in the MINECRAFT® dataset.

Evaluation Protocol

The synthesis model 150 and the animation model 120 were evaluated separately, following a similar evaluation protocol. The test dataset was divided into non-overlapping sequences of 16 frames sampled at 5 fps and 4 fps respectively for the MINECRAFT® and Tennis datasets and the synthesis model 150 or the animation model 120 were used to reconstruct them. In the case of the synthesis model 150, the video frames were directly reconstructed and the following metrics were computed:

Learned Perceptual Image Patch Similarity (LPIPS) is a standard metric for evaluating the reconstruction quality of the generated images;

Fréchet Inception Distance (FID) is a widely-used metric for image generation quality;

Fréchet Video Distance (FVD) is a standard metric for assessing the quality of generated videos;

Average Detection Distance (ADD) measures the average distance in pixels between the bounding box centers of ground truth bounding boxes and bounding boxes obtained from the generated sequences through a pre-trained detector; and Missing Detection Rate (MDR) estimates the rate of bounding boxes that are present in the ground truth videos, but that are missing in the generated videos.

For the animation model 120, reconstruction of the object properties were evaluated. As different strategies for masking affect the behavior of the model and the nature of the reconstruction task, different masking configurations corresponding to different inference tasks were separately evaluated. Metrics were computed that address both the fidelity of the reconstruction and the realism of the produced sequences:

To compute the fidelity of the reconstruction, The Euclidean ($L^2$) distance between the ground truth and reconstructed object properties along the sequence are computed.

To measure the realism of each object property, the Fréchet Distance (FD) between the distribution of real sequences of a certain object property and of generated ones is measured.

Different reconstruction tasks were selected on which to evaluate the method:

The video prediction conditioned on actions task consists in reconstructing the complete sequence starting from the state at the first timestep while the actions are specified for all timesteps.

The unconditioned video prediction task consists in reconstructing the complete sequence starting from the first state only.

The opponent modeling task consists in reconstructing the object properties of an unknown player, based on the state of the other player, with actions specified only on the known player. Good performance in this task indicates the ability to model an opponent against which a user can play.

The sequence completion task consists in reconstructing a sequence where eight consecutive states are missing. No actions are specified for the missing states. Good performance in this task indicates ability in reasoning on how it is possible to reach a certain goal state starting from the current one.

Synthesis Model Evaluation

The method was evaluated against Playable Environments (PE) that build a controllable environment representation where the position of each object is given but pose parameters are treated as a latent variable. Since the original method supports only outputs at 512×288 px resolution, baselines were produced that were trained at both 512×288 px and 1024×576 px resolution which are referred to herein as PE and PE+, respectively. For a fair comparison, the same mechanism was introduced in the baselines for representing ball blur and training a variant of the model using the same amount of computational resources as the baselines ("Ours Small" in Tables 2 and 3 below). Results of the comparison are shown in Table 2 and Table 3 for the Tennis and MINECRAFT® datasets, respectively.

Compared to PE, the synthesis model 150 generates sharper players and static scene elements. An ablation study showed corruption of the player geometry when voxels or the deformation model was not used. When removing the canonical plane representation, static scene elements appear blurry. When the feature enhancer is removed, the synthesis model 150 does not generate shadows and players lose quality.

TABLE 2

| | LPIPS↓ | FID↓ | FVD↓ | ADD↓ | MDR↓ |
|---|---|---|---|---|---|
| PE[†] [Menapace et al. 2022] | 0.188 | 11.5 | 349 | 3.74 | 0.200 |
| PE+ [Menapace et al. 2022] | 0.232 | 40.4 | 2432 | 132.3 | 49.7 |
| w/o enhancer F | 0.167 | 15.6 | 570 | 3.02 | 0.0728 |
| w/o explicit deformation in D | 0.156 | 13.3 | 524 | 3.10 | 0.0587 |
| w/o planes in C | 0.241 | 30.4 | 1064 | 2.94 | 0.0611 |
| w/o voxels in C | 0.170 | 17.1 | 757 | 3.03 | 0.0399 |
| w/o our encoder E | 0.174 | 15.0 | 600 | 3.18 | 0.0564 |
| Ours Small | 0.156 | 13.4 | 523 | 2.88 | 0.0470 |
| Ours | 0.152 | 12.8 | 516 | 2.88 | 0.0423 |

Table 2 provides a comparison with baselines and ablation on the Tennis dataset. Missing Detection Rate (MDR) is shown in percent and ADD in pixels. FID and FVD are computed on images downscaled to the feature extractor training resolution, thus blurriness in the PE baseline caused by its reduced resolution is not captured by these metrics. LPIPS correctly reflects lack of sharpness in the PE results.
† denotes output in 512×288 px rather than 1024×576 px resolution.

TABLE 3

| | LPIPS↓ | FID↓ | FVD↓ | ADD↓ | MDR↓ |
|---|---|---|---|---|---|
| PE[†] [Menapace et al. 2022] | 0.0235 | 13.9 | 21.5 | 5.77 | 0.0412 |
| PE+ [Menapace et al. 2022] | 0.0238 | 15.5 | 51.7 | 120.6 | 0.939 |
| Ours Small | 0.00996 | 3.56 | 8.83 | 2.02 | 0.0529 |
| Ours | 0.00814 | 2.81 | 7.08 | 1.98 | 0.0508 |

Table 3 provides a comparison with baselines and ablation on the MINECRAFT® dataset. MDR is shown in percent and ADD in pixels. † denotes output in 512×288 px rather than 1024×576 px resolution.

As illustrated in Tables 2 and 3, the disclosed method scores best in terms of LPIPS, ADD and MDR. Compared to PE+, the disclosed method produces significantly better FID and FVD scores. PE and PE+ produce checkerboard artifacts that are particularly noticeable on static scene elements such as judge stands, while the described method produces sharp details. This difference is attributed to the ray sampling scheme and feature enhancer design that, in contrast to PE, do not sample rays at low resolution and perform up-sampling, but rather directly operate on high resolution. In addition, thanks to the deformation and canonical space modeling strategies, and higher resolution, the described method produces more detailed players with respect to PE, where they frequently appear with missing limbs and blurred clothing. Finally, the described synthesis model 150 produces a realistic ball, while PE struggles to correctly model small objects, presumably due to its up-sampling strategy that causes rays to be sampled more sparsely and thus do not intersect with the ball frequently enough to correctly render its blur effect.

To validate the design choices, several variations of the method were produced, each produced by removing one of the architectural elements. For example, the enhancer F 290 was removed and $\tilde{I}$ 280 was directly considered as the output. In another example, the explicit deformation modeling procedure in D 250 was removed and substituted with an MLP directly predicting the deformation using a learnable pose code. In yet another example, the plane-based canonical volume representation in C 240 for planar objects was removed and an MLP was used instead. In other examples, the voxel-based volume representation in C 240 was removed and an MLP was used instead, and the style encoder E 230 was substituted with an ad-hoc encoder for each object in the scene.

The results of the ablation on the Tennis dataset are shown in Table 2. To reduce computation, the ablation models were trained using a reduced size of the batch and of the image patches. A version of the full model was also retrained in this setting for fairness of comparison (Ours Small).

When removing the enhancer F 290, the synthesis model 150 produced players with fewer details and did not generate shadow effects below players. When the deformation modeling procedure was not employed, the method produced comparable LPIPS, FID, and FVD scores, but an analysis of the qualitative features shows that players may appear with corrupted limbs. In addition, the use of such learned pose representation would reduce the controllability of the synthesis model 150 with respect to the use of an explicit kinematic tree. When plane-based or voxel-based canonical modeling was removed, artifacts were noticed in the static scene elements, such as corrupted logos, and in the players, such as detached or doubled limbs. Finally, when the style encoder design was replaced with the one used in the original dataset, fewer details in scene elements were noticed.

Animation Model Evaluation

Similarly to the synthesis model 150, the animation model 120 was compared against the Playable Environments (PE), which jointly learns discrete actions and generates sequences conditioned on such actions. Since it was assumed that the text action representations are available in the task, for fairness of evaluation the baseline was modified with the same text encoder T 210 to make use of the action information. To reduce computation, the comparison was performed using half of the computational resources and a reduced training schedule. Consequently, the described animation model 120 was also retrained to produce a reduced variant (Ours Small). To render results, the synthesis model 150 was always used.

Tables 4 and 5 show results for the Tennis and MINECRAFT® datasets, respectively. As shown, the method outperforms the baseline in all evaluation tasks according to both L2 and FD metrics. Sequences were produced in a video prediction setting that used the first frame object properties and all actions as conditioning. The location of players was consistently closer to the ground truth for the disclosed method. The disclosed method also captured the multimodal distribution of player poses and generated vivid limb movements, while the baselines produced poses as the average of the distribution, resulting in reduced limb movement and tilted root joints.

TABLE 4

Animation model comparison with baselines and ablation on the Tennis dataset. Position and Joints 3D in meters, Root angle in axis-angle representation.

| | Position | | Root angle | | Joints 3D | |
|---|---|---|---|---|---|---|
| | L2↓ | FD↓ | L2↓ | FD↓ | L2↓ | FD↓ |
| *Action conditioned video prediction* | | | | | | |
| PE | 3.117 | 87.688 | 1.182 | 12.627 | 0.277 | 30.711 |
| Rec. LSTM | 1.753 | 7.413 | 1.100 | 8.416 | 0.234 | 18.435 |
| Rec. Transf. | 1.183 | 2.996 | 0.913 | 7.566 | 0.212 | 15.976 |
| Ours Small | 1.244 | 1.071 | 1.187 | 0.601 | 0.178 | 1.570 |
| Ours | 1.064 | 0.846 | 0.961 | 0.421 | 0.153 | 1.049 |
| *Unconditional video prediction* | | | | | | |
| PE | 3.973 | 146.019 | 1.604 | 30.448 | 0.437 | 78.835 |
| Rec. LSTM | 2.064 | 11.283 | 1.224 | 14.860 | 0.264 | 28.736 |
| Rec. Transf. | 1.649 | 10.514 | 1.123 | 15.648 | 0.251 | 27.258 |
| Ours Small | 2.352 | 2.271 | 1.455 | 0.781 | 0.213 | 1.827 |
| Ours | 1.925 | 1.377 | 1.277 | 0.518 | 0.192 | 1.261 |
| *Opponent modeling* | | | | | | |
| PE | 1.720 | 40.766 | 0.814 | 6.783 | 0.246 | 40.441 |
| Rec. LSTM | 0.990 | 4.809 | 0.606 | 2.411 | 0.132 | 9.305 |
| Rec. Transf. | 0.294 | 0.364 | 0.403 | 1.623 | 0.100 | 5.628 |
| Ours Small | 0.344 | 0.187 | 0.581 | 0.301 | 0.088 | 0.765 |
| Ours | 0.252 | 0.143 | 0.437 | 0.198 | 0.069 | 0.478 |
| *Sequence completion* | | | | | | |
| PE | 4.353 | 641.976 | 0.903 | 13.955 | 0.251 | 62.981 |
| Rec. LSTM | 1.581 | 5.507 | 0.697 | 2.517 | 0.143 | 10.443 |
| Rec. Transf. | 1.169 | 3.735 | 0.631 | 2.514 | 0.138 | 10.519 |
| Ours Small | 1.578 | 2.243 | 0.832 | 0.560 | 0.114 | 0.851 |
| Ours | 1.153 | 1.349 | 0.763 | 0.288 | 0.101 | 0.558 |
| *Average* | | | | | | |
| PE | 3.291 | 229.112 | 1.126 | 15.953 | 0.303 | 53.242 |
| Rec. LSTM | 1.597 | 7.253 | 0.907 | 7.051 | 0.193 | 16.735 |
| Rec. Transf. | 1.074 | 4.462 | 0.767 | 6.838 | 0.175 | 14.845 |
| Ours Small | 1.380 | 1.443 | 1.014 | 0.560 | 0.148 | 1.253 |
| Ours | 1.099 | 0.929 | 0.844 | 0.356 | 0.129 | 0.836 |

TABLE 5

Animation model comparison with baselines and ablation on the Minecraft dataset. Position and Joints 3D in meters, Root angle in axis-angle representation.

| | Position | | Root angle | | Joints 3D | |
|---|---|---|---|---|---|---|
| | L2↓ | FD↓ | L2↓ | FD↓ | L2↓ | FD↓ |
| *Action conditioned video prediction* | | | | | | |
| PE | 2.720 | 90.904 | 1.822 | 23.949 | 0.365 | 47.956 |
| Rec. LSTM | 2.623 | 54.927 | 2.040 | 62.363 | 0.579 | 118.592 |
| Rec. Transf. | 2.798 | 76.582 | 1.794 | 52.677 | 0.506 | 100.731 |
| Ours Small | 0.533 | 2.494 | 0.901 | 5.624 | 0.145 | 4.083 |
| Ours | 0.523 | 2.582 | 0.749 | 4.578 | 0.135 | 3.794 |
| *Unconditional video prediction* | | | | | | |
| PE | 3.994 | 197.434 | 2.111 | 59.112 | 0.370 | 46.665 |
| Rec. LSTM | 2.850 | 68.915 | 1.999 | 69.886 | 0.581 | 121.187 |
| Rec. Transf. | 2.834 | 76.780 | 1.795 | 50.871 | 0.480 | 87.584 |
| Ours Small | 2.341 | 9.795 | 1.814 | 8.969 | 0.199 | 4.422 |
| Ours | 2.330 | 11.032 | 1.685 | 5.648 | 0.197 | 4.385 |

TABLE 5-continued

Animation model comparison with baselines and ablation on the Minecraft dataset. Position and Joints 3D in meters, Root angle in axis-angle representation.

| | Position | | Root angle | | Joints 3D | |
|---|---|---|---|---|---|---|
| | L2↓ | FD↓ | L2↓ | FD↓ | L2↓ | FD↓ |
| Sequence completion | | | | | | |
| PE | 1.504 | 29.582 | 0.926 | 10.634 | 0.197 | 24.096 |
| Rec. LSTM | 1.401 | 18.044 | 1.066 | 17.664 | 0.309 | 59.750 |
| Rec. Transf. | 0.830 | 6.232 | 0.700 | 4.822 | 0.170 | 21.615 |
| Ours Small | 0.379 | 1.095 | 0.516 | 3.456 | 0.077 | 2.265 |
| Ours | 0.343 | 0.830 | 0.433 | 2.022 | 0.065 | 1.899 |
| Average | | | | | | |
| PE | 2.739 | 103.973 | 1.620 | 31.232 | 0.311 | 39.572 |
| Rec. LSTM | 2.292 | 47.296 | 1.702 | 49.971 | 0.489 | 99.843 |
| Rec. Transf. | 2.154 | 53.198 | 1.430 | 36.123 | 0.385 | 69.977 |
| Ours Small | 1.084 | 4.461 | 1.077 | 6.016 | 0.140 | 3.590 |
| Ours | 1.065 | 4.815 | 0.956 | 4.083 | 0.132 | 3.360 |

In accordance with the FD metrics, the disclosed method is shown to produce more realistic player poses with respect to PE that tends to keep player poses close to the average pose and to slide the players on the scene. This difference is attributed to the use of the diffusion framework in the disclosed method. In the example of generating a player walking forward, it is equally probable that the player moves the left or right leg first. In the case of a reconstruction-based training objective such as the main one of PE, to minimize reconstruction error, the model is encouraged to produce an average leg movement result that consists in not moving the legs at all. On the other hand, diffusion models learn the multimodal distributions of the motion, thus they are able to sample one of the possible motions without averaging its predictions.

To validate this hypothesis and demonstrate the benefits of the diffusion formulation, two variations of the described method were produced. The first substitutes the diffusion framework with a reconstruction objective, keeping the transformer-based architecture unaltered. The second, in addition to using the reconstruction objective, also models the temporal model A 220 using a long short-term memory (LSTM) artificial neural network rather than a transformer, similarly to the PE baseline. Differently from the PE baseline, however, this variant does not make use of adversarial training and may employ a single LSTM model for all objects, rather than a separate model for each.

The results are provided in Tables 4 and 5 for the Tennis and MINECRAFT® datasets, respectively. The animation model 120 is shown to consistently outperform the baselines in terms of the Fréchet Distance, showing a better ability to capture realistic sequences. The disclosed method trained with a reconstruction objective produces player movement with noticeable artifacts analogously to PE, validating the choice of the diffusion framework.

It is noted that since the model is trained on a dataset showing only plausible actions, the model's behavior is not defined when an implausible action is specified, such as hitting a ball when it is too far from the player or jumping on a platform that is out of reach. In these cases, the model may produce outcomes such as running too fast or producing implausibly long jumps. In addition, the model may not generate plausible results in the case of actions extremely out of distribution such as performing a backflip or doing a push-up.

While the Tennis dataset contains varied text annotations that allow the model to generalize to text inputs with varied structure, the MINECRAFT® dataset's synthetic text annotations are less varied and the fixed synthetic structure of sentences tends to be memorized, making the model less effective if a different syntax is used. To address this issue, a more sophisticated algorithm can be employed to generate action annotation on the MINECRAFT® dataset.

The model learns to associate referential language to scene coordinates rather than the appearance of the referred object, and the model memorizes the position of contact surfaces. While tennis scenes always have the same structure, for MINECRAFT® the model cannot generalize to different scenes. This issue can be addressed by conditioning the animation model on the scene's geometry.

The methods described herein show the feasibility of learnable game engines solely from annotated data and show that textual action representations are important for unlocking high-level and fine-grained control over the generation process, and enabling compelling constraint and goal-driven generation applications. These results, jointly with two richly-annotated text-video datasets, pave the way towards learnable game engines for complex, real-world scenes.

Process Summary

Figure 11A:
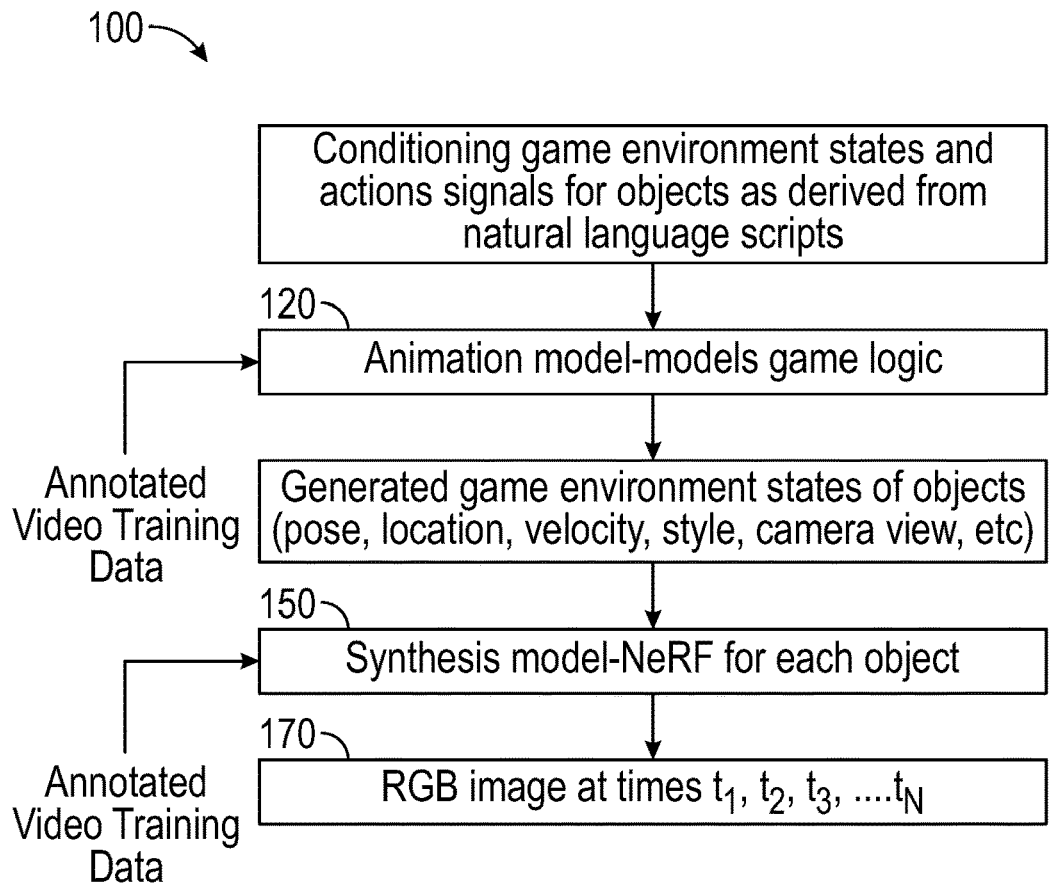
FIG. 11A is a simplified version of FIG. 1 illustrating a sample configuration of a learnable game engine implemented as a trained synthesis model and a trained diffusion-based animation model.

FIG. 11A is a simplified version of FIG. 1 illustrating a sample configuration of an LGE 100 implemented as a trained synthesis model 150 and a trained diffusion-based animation model. As illustrated, the LGE 100 receives from a user conditioning game environment states and action signals for objects. In sample configurations, the user conditioning game environment states and action signals are derived by a text encoder from natural language scripts.

The diffusion-based animation model 120 models logic of a game including player actions and interactions in the high-level representation of the game environment states by producing states of the game environment based on the user-provided conditioning signals for states and actions that are to be rendered by the synthesis model 150. The user-provided conditioning signals may take the form of values derived from natural language scripts including actions that a user wants to impose on one or more object properties in a gaming sequence of the game environment. The user-provided conditioning signals may include explicit state manipulation signals by which the user specifies a new state with altered values of at least one property of an object or high-level text-based editing signals by which the user provides high-level text based values of actions in the form of text that specifies how at least one object evolves in the sequence of game environment states.

The game environment states and actions of object (e.g., pose, location, velocity, style, camera view, etc.) generated by the animation model 120 are provided to the synthesis model 150 for generation of an RGB image 170 where the displayed game environment state includes a combination of all individual object states in the game environment. The synthesis model 150 renders a current game environment state using a composition of neural radiance fields, one for each object in the game environment. In sample configurations, each neural radiance field is bounded by a three-dimensional (3D) bounding box for each object. The synthesis model 150 renders a scene by sampling points independently for each object, querying respective object radiance fields, and sorting and integrating sampled values for different objects based on a distance from a camera origin in the game environment to produce the RGB image 170. The object properties may include object location, object style representing an appearance of the object that may vary in different sequences in the game environment, and/or object pose for an articulatable object.

In sample configurations, the synthesis model 150 includes a convolutional style encoder that extracts an appearance co of each object at respective camera angles in the game environment by computing two-dimensional (2D) bounding boxes for each object in a game environment state, using a set of residual blocks in the 2D bounding boxes to extract frame features in a feature map where the features are cropped around each object according to the 2D bounding box during training using region of interest pooling, and using a series of convolutional layers with a final projection to predict a style code from at least one cropped feature map during inference.

Each object in the game environment may be represented in its canonical pose for neural radiance field conditioning on style data and deformations of articulatable objects in the game environment may be modeled by a deformation model based on pose of the articulatable objects. In sample configurations, the deformation model of the animation model 120 implements a deformation procedure based on linear blend skinning to the articulatable objects in the game environment. The synthesis model 150 may be based on a compositional neural radiance field framework that enables explicit control over a camera of the game environment and represents a scene in the game environment as a composition of different, independent objects, whereby each object in the game environment is modeled using a set of object properties that enable creation of a game environment state representation where each object property is linked to an aspect of a corresponding object. The synthesis model 150 also may include a feature enhancer convolutional neural network that maps a grid of features and style codes of the objects in the game environment into RGM image 170 representing the objects.

In sample configurations, the diffusion-based animation model 120 predicts evolution of the game environment in time as a sequence of game environment states in response to the user-provided conditioning signals that provide user control over sequence generation of the game environment states. The diffusion-based animation model 120 may include a denoising diffusion probabilistic models (DDPM) diffusion framework including a temporal model based on a non-autoregressive masked transformer design and a text encoder that encodes textual action conditioning information received from the user as text-based information into a sequence of text action embeddings. The temporal model may leverage knowledge of a pretrained language model in the text encoder to model the action conditioning information. The temporal model may follow the DDPM diffusion framework to predict unknown state values in a sequence of the game environment states conditioned on known state values, text action embeddings, and respective state and action masks. The temporal model also may predict noise applied to noisy states conditioned on known partial states and actions with respective masks for the states and actions. The respective state and action masks may be set to one when a respective conditioning signal corresponding to the respective state and action mask is present.

Figure 11B:
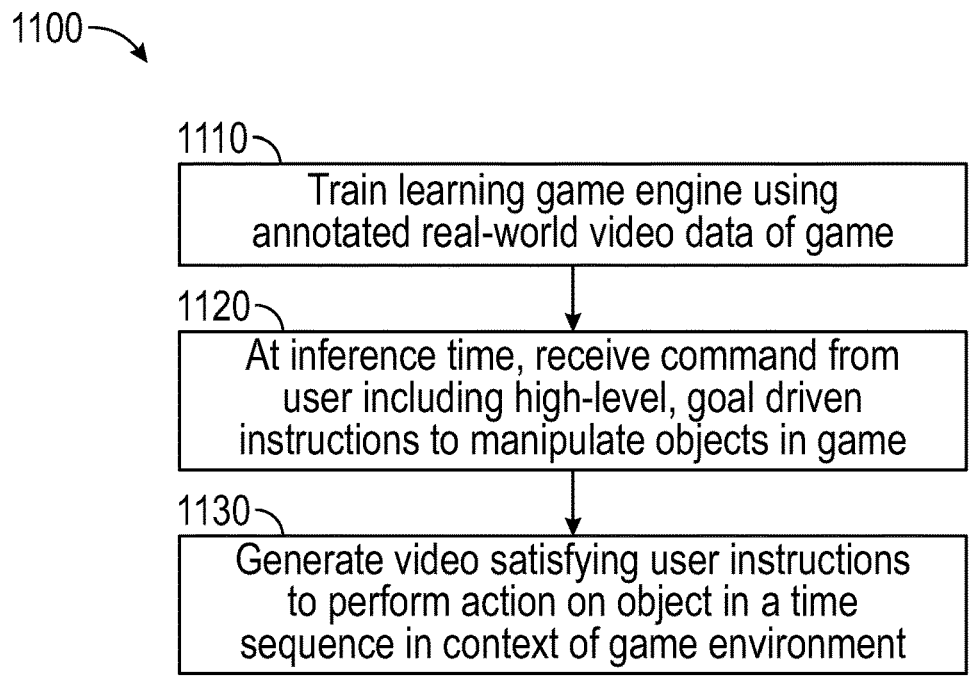
FIG. 11B is a flowchart depicting example steps of a method of rendering a game environment of a computer video game using the learnable game engine of FIG. 11A.

FIG. 11B is a flow chart depicting example steps of a method 1100 of rendering a game environment of a computer video game using the learnable game engine 100 of FIG. 11A. The method 1100 includes training a learnable game engine at 1110 using an annotated real-world video data of a game including dynamics and semantics of the game. The training may use a set of videos with annotations to train the learnable game engine to manipulate a camera, object style representing an appearance of an object that may vary in different time sequences in the game environment, a text prompt, and/or a user annotation that is implemented at inference time. Then, at inference time, a command is received at 1120 from a user including high-level, goal-driven instructions to one or more objects in the game environment. At 1130, a video is generated that satisfies the user's high-level, goal driven instructions by leveraging knowledge of the dynamics and semantics of the game learned during training to perform an action on the object(s) in a time sequence in a context of the game environment. In sample configurations, the method also includes converting the high-level, goal driven instructions into conditioning signals in a form of values derived from natural language scripts including actions that the user wants to impose on one or more object properties in a gaming sequence of the game environment.

The method enables multiple applications. For example, generating the video may include swapping style and/or camera depth of a first object in a first image with a style or a camera depth of a second object in a second image in the game environment. The command from the user may include user-specified actions for at least one player in the game environment. In such case, generating the video may include controlling the at least one player in respective frames of the video in accordance with the user-specified actions for the at least one player. Generating the video also may include generating intermediate states between an initial game environment state and a final game environment state based on the user's high-level, goal driven instructions specified by means of a natural language action. These and other applications will become apparent to those skilled in the art from the descriptions provided herein.

Processing Platform

Figure 12:
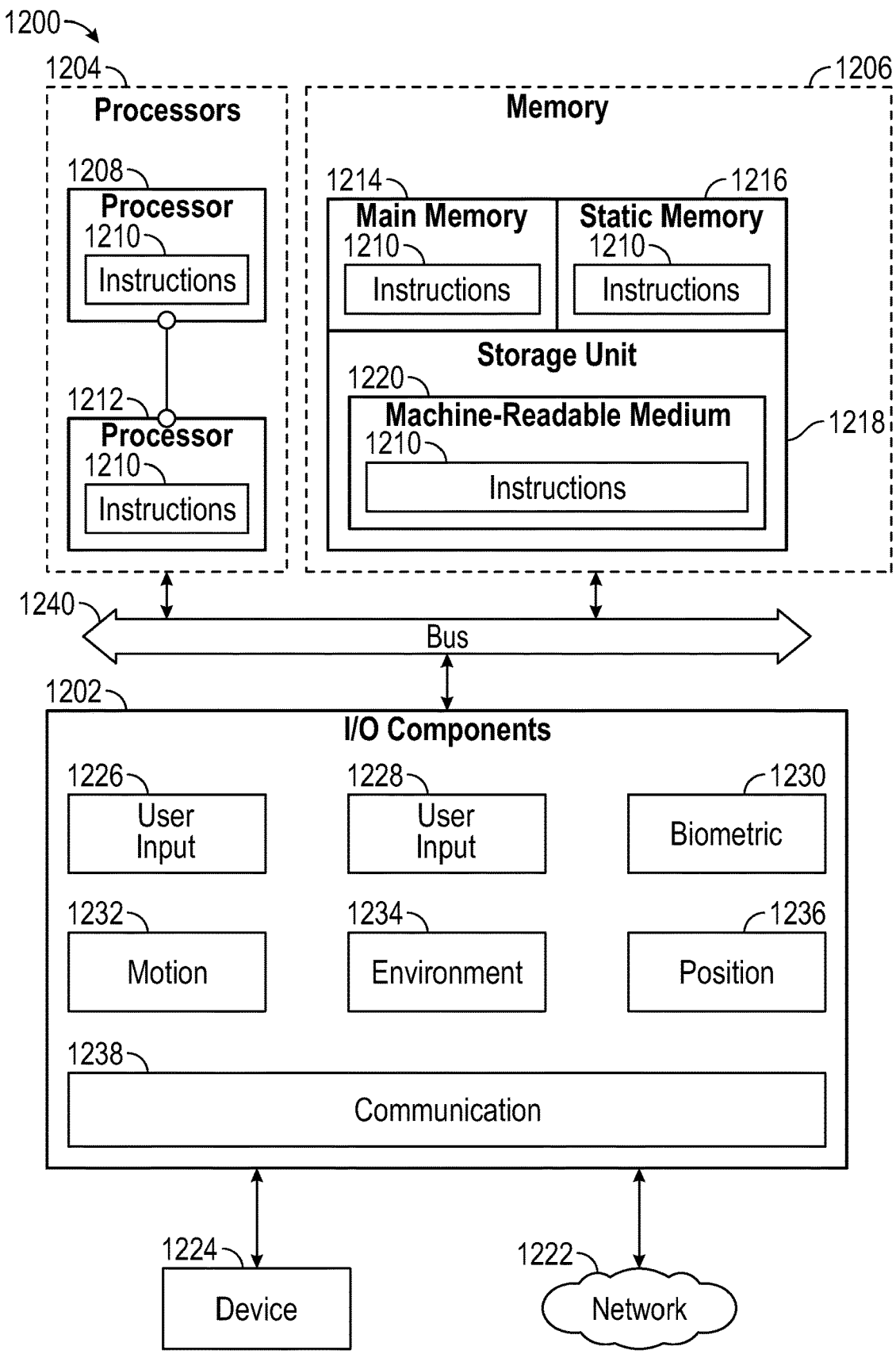
FIG. 12 is a diagram of a machine adapted to perform one or more of the methodologies described herein.

FIG. 12 is a diagrammatic representation of the machine 1200 within which instructions 1210 (e.g., software, a program, an application, an applet, an app, or other executable code) for causing the machine 1200 to perform one or more of the methodologies discussed herein may be executed. For example, the instructions 1210 may cause the machine 1200 to execute one or more of the methods described herein. The instructions 1210 transform the general, non-programmed machine 1200 into a particular machine 1200 programmed to carry out the described and illustrated functions in the manner described. The machine 1200 may operate as a standalone device or may be coupled (e.g., networked) to other machines. In a networked deployment, the machine 1200 may operate in the capacity of a server machine or a client machine in a server-client network environment, or as a peer machine in a peer-to-peer (or distributed) network environment. The machine 1200 may include, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1210, sequentially or otherwise, that specify actions to be taken by the machine 1200. Further, while only a single machine 1200 is illustrated, the term "machine" shall also be taken to include a collection of machines that individually or jointly execute the instructions 1210 to perform one or more of the methodologies discussed herein. The machine 1200, for example, may include the LGEs 100 described herein. In some examples, the machine 1200 may also include both client and server systems, with certain operations of a particular method or algorithm being performed on the server-side and with certain operations of the particular method or algorithm being performed on the client-side.

The machine 1200 may include processors 1204, memory 1206, and input/output I/O components 1202, which may be configured to communicate with each other via a bus 1240. In an example, the processors 1204 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1208 and a processor 1212 that execute the instructions 1210. The term "processor" is intended to include multi-core processors that may include two or more independent processors (sometimes referred to as "cores") that may execute instructions contemporaneously. Although FIG. 12 shows multiple processors 1204, the machine 1200 may include a single processor with a single core, a single processor with multiple cores (e.g., a multi-core processor), multiple processors with a single core, multiple processors with multiples cores, or any combination thereof.

The memory 1206 includes a main memory 1214, a static memory 1216, and a storage unit 1218, both accessible to the processors 1204 via the bus 1240. The main memory 1206, the static memory 1216, and storage unit 1218 store the instructions 1210 for one or more of the methodologies or functions described herein. The instructions 1210 may also reside, completely or partially, within the main memory 1214, within the static memory 1216, within machine-readable medium 1220 within the storage unit 1218, within at least one of the processors 1204 (e.g., within the Processor's cache memory), or any suitable combination thereof, during execution thereof by the machine 1200.

The I/O components 1202 may include a wide variety of components to receive input, provide output, produce output, transmit information, exchange information, capture measurements, and so on. The specific I/O components 1202 that are included in a particular machine will depend on the type of machine. For example, portable machines such as mobile phones may include a touch input device or other such input mechanisms, while a headless server machine will likely not include such a touch input device. It will be appreciated that the I/O components 1202 may include many other components that are not shown in FIG. 12. In various examples, the I/O components 1202 may include user output components 1226 and user input components 1228. The user output components 1226 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1228 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1202 may include biometric components 1230, motion components 1232, environmental components 1234, or position components 1236, among a wide array of other components. For example, the biometric components 1230 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1232 include acceleration sensor components (e.g., accelerometer), gravitation sensor components, rotation sensor components (e.g., gyroscope).

The environmental components 1234 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

The position components 1236 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1202 further include communication components 1238 operable to couple the machine 1200 to a network 1222 or devices 1224 via respective coupling or connections. For example, the communication components 1238 may include a network interface Component or another suitable device to interface with the network 1222. In further examples, the communication components 1238 may include wired communication components, wireless communication components, cellular communication components, Near Field Communication (NFC) components, Bluetooth© components (e.g., Bluetooth® Low Energy), Wi-Fi® components, and other communication components to provide communication via other modalities. The devices 1224 may be another machine or any of a wide variety of peripheral devices (e.g., a peripheral device coupled via a USB).

Moreover, the communication components 1238 may detect identifiers or include components operable to detect identifiers. For example, the communication components 1238 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1238, such as location via Internet Protocol (IP) geolocation, location via Wi-Fi® signal triangulation, location via detecting an NFC beacon signal that may indicate a particular location, and so forth.

The various memories (e.g., main memory 1214, static memory 1216, and memory of the processors 1204) and storage unit 1218 may store one or more sets of instructions and data structures (e.g., software) embodying or used by one or more of the methodologies or functions described herein. These instructions (e.g., the instructions 1210), when executed by processors 1204, cause various operations to implement the disclosed examples.

The instructions 1210 may be transmitted or received over the network 1222, using a transmission medium, via a network interface device (e.g., a network interface component included in the communication components 1238) and using any one of several well-known transfer protocols (e.g., hypertext transfer protocol (HTTP)). Similarly, the instructions 1210 may be transmitted or received using a transmission medium via a coupling (e.g., a peer-to-peer coupling) to the devices 1224.

Figure 13:
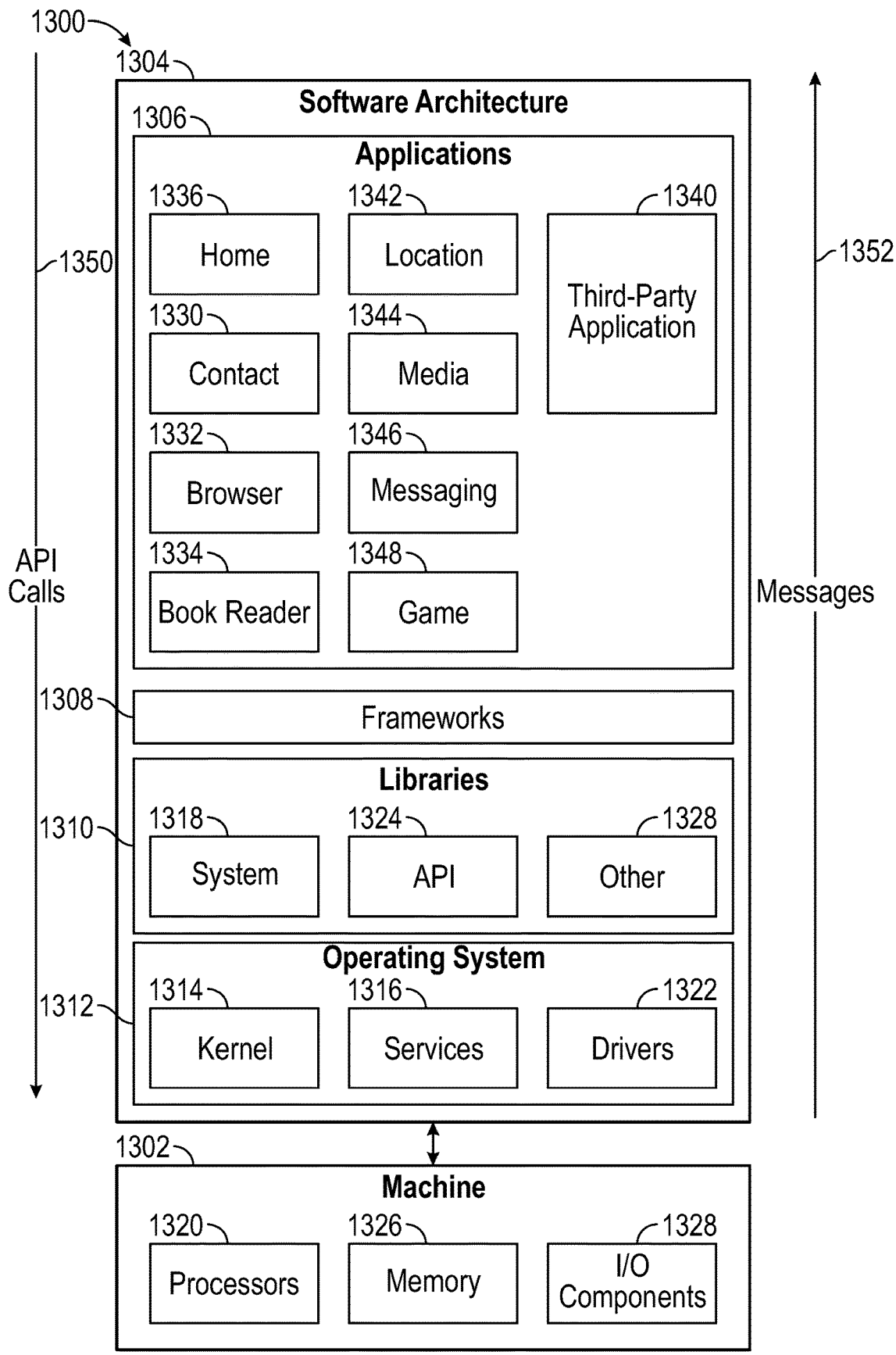
FIG. 13 is a block diagram showing a software architecture within which examples described herein may be implemented.

FIG. 13 is a block diagram 1300 illustrating a software architecture 1304, which can be installed on one or more of the devices described herein. The software architecture 1304 is supported by hardware such as a machine 1302 (see FIG. 12) that includes processors 1320, memory 1326, and I/O components 1328. In this example, the software architecture 1304 can be conceptualized as a stack of layers, where each layer provides a particular functionality. The software architecture 1304 includes layers such as an operating system 1312, libraries 1310, frameworks 1308, and applications 1306. Operationally, the applications 1306 invoke API calls 1350 through the software stack and receive messages 1352 in response to the API calls 1350.

The operating system 1312 manages hardware resources and provides common services. The operating system 1312 includes, for example, a kernel 1314, services 1316, and drivers 1322. The kernel 1314 acts as an abstraction layer between the hardware and the other software layers. For example, the kernel 1314 provides memory management, processor management (e.g., scheduling), component management, networking, and security settings, among other functionality. The services 1316 can provide other common services for the other software layers. The drivers 1322 are responsible for controlling or interfacing with the underlying hardware. For instance, the drivers 1322 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1310 provide a common low-level infrastructure used by the applications 1306. The libraries 1310 can include system libraries 1318 (e.g., C standard library) that provide functions such as memory allocation functions, string manipulation functions, mathematic functions, and the like. In addition, the libraries 1310 can include API libraries 1324 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1310 can also include a wide variety of other libraries 1328 to provide many other APIs to the applications 1306.

The frameworks 1308 provide a common high-level infrastructure that is used by the applications 1306. For example, the frameworks 1308 provide various graphical user interface (GUI) functions, high-level resource management, and high-level location services. The frameworks 1308 can provide a broad spectrum of other APIs that can be used by the applications 1306, some of which may be specific to a particular operating system or platform.

In an example, the applications 1306 may include a home application 1336, a contacts application 1330, a browser application 1332, a book reader application 1334, a location application 1342, a media application 1344, a messaging application 1346, a game application 1348, and a broad assortment of other applications such as a third-party application 1340. The applications 1306 are programs that execute functions defined in the programs. Various programming languages can be employed to generate one or more of the applications 1306, structured in a variety of manners, such as object-oriented programming languages (e.g., Objective-C, Java, or C++) or procedural programming languages (e.g., C or assembly language). In a specific example, the third-party application 1340 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1340 can invoke the API calls 1350 provided by the operating system 1312 to facilitate functionality described herein.

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component includes a general-purpose processor configured by software to become a special-purpose processor, the general-purpose processor may be configured as respectively different special-purpose processors (e.g., including different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors.

Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A non-transitory machine readable medium comprising instructions stored thereon that are executable by one or more processors to cause a computing device to implement a learnable game engine, comprising:
   a synthesis neural network trained to generate an image from a high-level representation of a game environment state including at least one of pose, location, object style or velocity of objects in the game environment, a background style, and a camera view of the game environment, wherein the game environment state comprises a combination of all individual object states in the game environment; and
   a diffusion-based animation neural network trained to model logic of a game including player actions and interactions in the high-level representation of the game environment states, the diffusion-based animation neural network producing states of the game environment based on user-provided conditioning signals for states and actions, wherein the produced states are subsequently rendered by the synthesis neural network, the diffusion-based animation neural network including a text encoder that derives values for the user-provided conditioning signals from natural language scripts including actions that a user wants to impose on one or more object properties in a gaming sequence of the game environment.

2. The machine readable medium of claim 1, wherein the synthesis neural network includes a composition of neural radiance fields that renders a current game environment state, one neural radiance field for each object in the game environment.

3. The machine readable medium of claim 2, wherein each neural radiance field is bounded by a three-dimensional (3D) bounding box for each object and the synthesis neural network renders a scene by sampling points independently for each object, querying respective object radiance fields, and sorting and integrating sampled values for different objects based on a distance from a camera origin in the game environment to produce a final color image.

4. The machine readable medium of claim 1, wherein the one or more object properties comprise at least one of object location, object style representing an appearance of the object that may vary in different sequences in the game environment, or object pose for an articulatable object.

5. The machine readable medium of claim 1, wherein the synthesis neural network comprises a convolutional style encoder that extracts an appearance of each object at respective camera angles in the game environment by extracting frame features in a feature map where the frame features are cropped around each object according to a 2D bounding box around each object during training using region of interest pooling, the convolutional style encoder including a series of convolutional layers that predict a style code from at least one cropped feature map during inference.

6. The machine readable medium of claim 5, wherein each object in the game environment is represented in its canonical pose for neural radiance field conditioning on style code, and deformations of articulatable objects in the game environment are modeled by a deformation model based on pose of the articulatable objects.

7. The machine readable medium of claim 6, wherein the deformation model implements a deformation procedure based on linear blend skinning to the articulatable objects in the game environment.

8. The machine readable medium of claim 1, wherein the synthesis neural network includes a compositional neural radiance field framework that controls a camera of the game environment and represents a scene in the game environment as a composition of different, independent objects, whereby each object in the game environment is modeled using a set of object properties that enable creation of a game environment state representation where each object property is linked to an aspect of a corresponding object.

9. The machine readable medium of claim 8, wherein the synthesis neural network comprises a feature enhancer convolutional neural network that maps a grid of features and style codes of the objects in the game environment into red, green, blue images representing the objects.

10. The machine readable medium of claim 1, wherein the diffusion-based animation neural network predicts evolution of the game environment in time as a sequence of game environment states in response to the user-provided conditioning signals that provide user control over sequence generation of the game environment states.

11. The machine readable medium of claim 10, wherein the user-provided conditioning signals comprise at least one of explicit state manipulation signals by which the user specifies a new state with altered values of at least one property of an object or high-level text-based editing signals by which the user provides high-level text based values of actions in textual form that specifies how at least one object evolves in the sequence of game environment states.

12. The machine readable medium of claim 10, wherein the diffusion-based animation neural network comprises a denoising diffusion probabilistic models (DDPM) diffusion framework comprising a temporal model based on a non-autoregressive masked transformer design and the text encoder encodes textual action conditioning information received from the user as text-based information into a sequence of text action embeddings, and wherein the temporal model leverages knowledge of a pretrained language model in the text encoder to model the action conditioning information.

13. The machine readable medium of claim 12, wherein the temporal model predicts masked state values in a sequence of the game environment states conditioned on known state values, text action embeddings, and respective state and action masks, the temporal model using the DDPM diffusion framework to predict noise applied to noisy states conditioned on known partial states and actions with respective masks for the states and actions.

14. The machine readable medium of claim 13, wherein the respective state and action masks are set to one when a respective conditioning signal corresponding to the respective state and action mask is present.

15. A method of rendering a game environment of a computer video game, comprising:
    training a learnable game engine of claim 1 using an annotated real-world monocular video data of a game including dynamics and semantics of the game;
    at inference time, receiving a command from a user including high-level, goal-driven instructions or a specific value for an object property to manipulate one or more objects in the game environment; and
    generating a video that satisfies the high-level, goal-driven instructions by leveraging knowledge of the dynamics and semantics of the game learned during training to perform action on the one or more objects in a time sequence in a context of the game environment.

16. The method of claim 15, wherein the training uses a set of videos with annotations to train the learnable game engine to manipulate at least one of a camera, object style representing an appearance of an object that may vary in different time sequences in the game environment, object location, or an object pose at inference time.

17. The method of claim 15, wherein further comprising converting the high-level, goal-driven instructions into conditioning signals in a form of values derived from natural language scripts including actions that the user wants to impose on one or more object properties in a gaming sequence of the game environment.

18. The method of claim 16, wherein generating the video comprises swapping at least one of style of a first object in a first image with a style of another object in another object in a second image in the game environment.

19. The method of claim 16, wherein receiving the command comprises receiving user-specified actions for at least one player in the game environment and generating the video comprises controlling the at least one player in respective frames of the video in accordance with the user-specified actions for the at least one player.

20. The method of claim 15, wherein generating the video comprises generating intermediate states between an initial game environment state and a final game environment state based on the high-level, goal-driven instructions specified by means of a natural language action.

* * * * *